(12) United States Patent
Sutton-Shearer

(10) Patent No.: US 9,767,314 B2
(45) Date of Patent: Sep. 19, 2017

(54) SYSTEM AND METHOD FOR HOSTING A SOCIAL NETWORK THAT ENABLES GRANULAR MANAGEMENT OF THE PRIVACY OF POSTED INFORMATION

(75) Inventor: Drake Sutton-Shearer, Los Angeles, CA (US)

(73) Assignee: Bimodal LLC, Wilmington, DE (US)

( * ) Notice: Subject to any disclaimer, the term of this patent is extended or adjusted under 35 U.S.C. 154(b) by 1924 days.

(21) Appl. No.: 12/770,471

(22) Filed: Apr. 29, 2010

(65) Prior Publication Data

US 2011/0271328 A1 Nov. 3, 2011

(51) Int. Cl.
*G06Q 99/00* (2006.01)
*G06F 21/62* (2013.01)
*G06Q 10/10* (2012.01)
*G06Q 50/00* (2012.01)

(52) U.S. Cl.
CPC ......... *G06F 21/6245* (2013.01); *G06Q 10/10* (2013.01); *G06Q 50/01* (2013.01)

(58) Field of Classification Search
CPC .................................................. G06F 21/00
USPC .......................................................... 726/27
See application file for complete search history.

(56) References Cited

U.S. PATENT DOCUMENTS

| | | | |
|---|---|---|---|
| 8,190,733 B1 | 5/2012 | Hoffman et al. | 709/224 |
| 2007/0219994 A1* | 9/2007 | Lemelson | 707/7 |
| 2008/0189188 A1* | 8/2008 | Morgenstern | 705/26 |
| 2009/0222424 A1 | 9/2009 | Van | 707/3 |
| 2010/0208662 A1* | 8/2010 | Fuste Vilella et al. | 370/328 |
| 2011/0166941 A1 | 7/2011 | Sutton-Shearer | 705/14.69 |
| 2011/0302037 A1 | 12/2011 | Sutton-Shearer | 705/14.66 |

OTHER PUBLICATIONS

Calderon, Sara Ines, How to Protect Your Privacy with Facebook's New Privacy Settings in 17 Easy Steps. Jan. 2010. http://www.insidefacebook.com/2010/01/19/how-to-protect-your-privacy-with-facebook%E2%80%99s-new-privacy-settings-in-17-easy-steps/.*
Office Action for U.S. Appl. No. 12/770,471 dated Jan. 7, 2010; 18 Pages.

* cited by examiner

*Primary Examiner* — Jonathan Ouellette
*Assistant Examiner* — Maame Ofori-Awuah
(74) *Attorney, Agent, or Firm* — Duncan Galloway Egan Greenwald, PLLC; Kevin T. Duncan

(57) ABSTRACT

A system and method for hosting a social network that enables entities to particularly manage the privacy level of content posted on the social network. This may enable an entity to distribute news, congratulations, accolades, invitations, and/or other internal information within the social network to members, employees, students, investors, and/or other parties.

19 Claims, 12 Drawing Sheets

US 9,767,314 B2

SYSTEM AND METHOD FOR HOSTING A SOCIAL NETWORK THAT ENABLES GRANULAR MANAGEMENT OF THE PRIVACY OF POSTED INFORMATION

FIELD OF THE INVENTION

The invention relates to a system and method for hosting a social network that recognizes associations other than social relationships separately from social relationships for purposes of information privacy management, and that provides control over the privacy of individual pieces of information released over the social network to facilitate use of the social network by entities like corporations or companies, schools, charitable organizations, government departments, and/or other entities.

BACKGROUND OF THE INVENTION

Social networking websites exist. Generally, these websites enable users to establish relationships (e.g., friends, buddies, and/or other relationships) so that the users can stay abreast of the activities, thoughts, posts, and/or other content provided to the social network by their friends. However, the relationships recognized by conventional social networking websites tend to reflect social relationships. As such, information released on social networks tends to be distributed in a viral manner across the network without regard for the privacy of the information.

While privacy controls do exist, these privacy controls must be applied in the context of the social relationships recognized by conventional social networks. Further, the privacy controls tend to only provide control over classes of information, and not over individual pieces of information posted to the social network.

SUMMARY

One aspect of the invention relates to a system and method for hosting a social network that enables entities to particularly manage the privacy level of content posted on the social network. This may enable an entity to distribute news, congratulations, accolades, invitations, and/or other internal information within the social network to members, employees, students, investors, and/or other parties. Associations between entities (e.g., between a company or corporation and its employees or investors, between a school and its students, between a charitable organization and its members, and/or between other entities) may be determined and stored so that information distributed over the social network can be distributed to with the appropriate privacy. For example, information related to a corporation participating in the social network may be distributed only to other entities that are associated with the corporation (e.g., employees, investors, partners, and/or other entities). Privacy settings that may determine which entities on the social network receive access to information may be set on a granular level (e.g., a per-post, per-achievement, per-certificate, per-message, per-rating level) in order to facilitate distribution of private and/or sensitive information.

The system and method may provide for the recognition of activities and/or accomplishments by entities on the social network. Such recognition may be provided in the form of achievements posted by an entity to its own wall, and/or certificates received by the entity from other entities. In order to facilitate the generation and posting of achievements and/or certificates on the social network for activities and/or accomplishments that are internal to an entity (e.g., recognition of individual employee accomplishments or contests, performance goals for an organization, and/or other accomplishments) a privacy level may be set for individual achievements and/or certificates before they are posted on entity walls. If an achievement is private, then the achievement may be viewable on the wall of the posting entity only for other entities that are associated with the posting entity (e.g., employees associated with a corporation) If a certificate is private, then the certificate may be viewable on the wall of a receiving entity only for other entities that are associated with the issuing entity.

The system and method may provide for internal communication to be accomplished on the social network in an interactive manner between a plurality of associated entities, while still maintaining the privacy of the internal communications. For example, a first entity may generate a message for posting on the wall of a second entity. The first entity may set a privacy level for the message. If the privacy level of the message makes the message private, the message may be viewable on the wall of the second entity only for other entities that have a requisite association with the second entity. For example, an employee of a corporation may post an internal message on the wall of the corporation, and may set the privacy level of the message such that only other employees of the corporation may view the internal message on the wall.

One aspect of the invention relates to a system including a server and/or other components configured to provide a social network website to entities. The server may be configured to execute one or more of an entity profile module, an entity wall module, a profile management module, an association module, an achievement module, a gift module, a certificate creation module, a certificate transmission module, a certificate acceptance module, a message module, a ratings module, a categories module, and/or other modules.

The entity profile module may be configured to manage entity profiles associated with entities that use social network. The entity profiles may include identification information, contact information, login information, friendship information, product information, cause information, and/or other information.

The entity wall module may be configured to assemble webpages defining views of walls associated with individual entities. As used herein, the term "wall" may refer to a homepage of an entity in the social networking website that is accessible to other entities (e.g., the wall is outward facing). A wall may include information that an entity wants other entities to have access to.

The profile management module may be configured to assemble webpages that include a user interface having selectable controls that enable entities to manage their profiles. For example, the user interface may enable entities to edit entity information, configure their walls, and/or otherwise manage their profiles.

The association module may be configured to manage associations between entities that participate in the social network. As used herein, the term "association" may refer to between relationships between entities that are associated with each other. Such associations may denote membership of an entity in another entity, employment of an entity by another entity, a fiduciary relationship between entities, and/or other associations.

The association module may be configured to receive requests for associations between entities. The requests may be received from requesting entities. In some implementations, a single entity may have several levels of associations. For example, a charitable organization may have tiered levels of associations based on amounts donated. As another example, a corporation may have a level of association for executives, a level of association for staff, a level of association for investors, and/or other levels of association. Other examples of entities having levels of association exist. If the association is being requested by for a responding entity that has a plurality of association levels, once the responding entity has been entered or selected, a menu enabling the requesting entity to request an appropriate level may be automatically populated.

The association module may be configured to present requests for associations to responding entities. The presentation of a request to a responding entity may include the requesting entity, and/or the association level requested, and may be configured to receive a response of the responding user (e.g., acceptance, rejection, modification, and/or other responses). The responding entity may set the association level of the association before responding to the request. This may include modifying the association level designated by the requesting entity, and/or may include selection of an association level where none was previously designated in the request.

The association module may be configured to provide the responses of the responding entities to the requesting entities. The association module may further store and/or cause storage of the associations.

The achievement module may be configured to enable entities to manage achievements. The achievements of a given entity may include the achievements of the entity posted on the wall of that entity, and/or achievements of the entity posted on the wall of other entities. To add an its profile and/or wall, one or more of the following may be received by the server from the entity, a title, a description of the achievement, content associated with the achievement, a date associated with the achievement, a category, a privacy level for the achievement, and/or other information related to the achievement.

The level of privacy assigned to the achievement may dictate which entities have access to the achievement. For example, if the level of privacy is low (e.g., public), the achievement may be viewed on the wall of the entity by any entities that access the wall. If the level of privacy is high (e.g., private), the achievement may be viewable on the wall of the entity by other entities that are associated with the entity posting the achievement, but may be hidden on the wall from other entities that are not associated with the entity posting the achievement. This example of a purely public/private implementation is not intended to be limiting. The privacy levels may be further graduated so that the achievement is hidden or accessible not only based on whether an entity is associated with the entity posting the achievement, but also the level of the association. For example, in a corporation, the privacy level of an achievement may be set so that the achievement is viewable by executives and investors of the entity posting the achievement, but may remain hidden from staff and the general public.

The addition of an achievement to a wall may result in a notification being provided to entities that are friends of the entity posting the achievement, and/or friends of the entity that is associated with the achievement. The entities to which the notification is provided may be filtered based on associations between the entities and the entity posting the achievement. For example, the filtering may be performed similarly to the discussion above of the accessibility of the achievement for only some entities, based on the privacy level of the achievement and the associations between the other entities and the entity posting the achievement. The entities that receive the notification may be the same entities that are able to access (or view) the achievement on the wall of the entity posting the achievement.

The privacy level may be set on a per-achievement basis. The various levels of privacy may further enable customization of the level of access provided to different sets of other entities for the individual achievements. This may provide enhanced control over the access for the entity posting the achievements to its wall, with respect to conventional social networks that may not provide for such a granular approach to privacy.

The gift module may be configured to enable entities to buy and/or send gifts to each other. To accomplish this, the gift module may be configured to assemble webpages including selectable controls by which an entity purchases and/or configures a virtual gift for another entity. Gifts may be purchased with virtual currency, real world currency, and/or other consideration.

The gift module may enable the entity sending the gift to select or enter a privacy level for the gift. The privacy level may dictate which entities outside of the entity receiving the gift will be able to view the gift (or evidence of the gift) on the wall of the entity receiving the gift. By way of non-limiting example, if the privacy level for the gift is high (e.g., private), entities that are not associated with the entity giving the gift may not be able to view the gift on the wall of the entity receiving the gift, while entities that are associated with the entity giving the gift are provided with views of the wall of the entity receiving the gift that include the gift. However, if the privacy level is low (e.g., public) view of the wall of the entity receiving the gift may include the gift without regard for whether the entity viewing the wall is associated with the entity that gave the gift.

The certificate creation module may be configured to assemble webpages defining a user interface by which issuing entities can generate certificates for receiving entities. The certificates may affirm or certify achievements or activities by the receiving entities. The certificates may identify the corresponding issuing entities. The identification of the issuing entity in a certificate may serve to verify the authenticity and/or value of the certificate. The certificate creation module may be configured to receive selection or entry of a privacy setting for generated certificates. The privacy setting may dictate which entities are provided with views of the wall of the issuing and/or receiving entities that include indications of the certificates generated.

For example, if the level of privacy is low (e.g., public), the certificate may be viewed on the wall of the receiving entity by any entities that access the wall. On the other hand, if the level of privacy is low (e.g., public), an indication of the generation of the certificate by the issuing entity may be viewed on the wall of the issuing entity by any entities that access the wall. If the level of privacy is high (e.g., private), the certificate may be viewable on the wall of the receiving entity by other entities that are associated with the issuing entity, but may be hidden on the wall from other entities that are not associated with the issuing entity posting the achievement. Similarly, for a certificate with a high level of privacy, the indication on the wall of the issuing entity may only be viewable for other entities that are associated with the issuing entity, while for a certificate with a low level of privacy, the indication may be viewable without regard for associations with the issuing entity. This example of a purely public/private implementation is not intended to be limiting.

The generation of a certificate may result in a notification being provided to entities that are friends of the receiving and/or issuing entities, and/or entities that are associated with the receiving and/or issuing entities. The entities to which the notification is provided may be filtered based on associations between the entities and the issuing entity. For example, the filtering may be performed similarly to the discussion above of the accessibility of the certificates for only some entities, based on the privacy level of the certificate and the associations between the other entities and the issuing entity. The entities that receive the notification may include the same entities that are able to access (or view) the certificate on the wall of the receiving entity. This may include transmitting the notification to entities that are friends of the receiving entity, and that are appropriately associated with the issuing entity.

Control over the privacy level may enable the accessibility of certificates generated by an issuing entity to be set on a per-certificate basis. The various levels of privacy may further enable customization of the level of access provided to different sets of other entities for the individual certificates. This may provide enhanced control over the access for the issuing entity, with respect to conventional social networks that may not provide for such a granular approach to privacy. For example, a corporation and/or company may issue certificates for activities by employees that are internal to the corporation or company (e.g., leading salesperson, excellent customer service, project deadlines and/or budgets met, and/or other activities). By setting an appropriate privacy level for the certificates, the certificates on the walls of the receiving entities (the employees), and the indications of the certificates on the wall of the issuing entity (the corporation) may be viewable within the social network by other employees, investors, partners, and/or other suitable entities and maintained private from the general public.

The certificate transmission module may be configured to transmit generated certificates to the receiving entities. Transmission of a given certificate to a receiving entity may result in display of the transmitted certificate on the wall of receiving entity, in accordance with the privacy setting of the certificate (e.g., as described above). The certificates may be defined by the certificate creation module such that upon receiving a certificate, a receiving entity may print out a copy of the certificate that can be displayed in the real world (e.g., framed and hung).

The certificate acceptance module may be configured to enable entities receiving certificates to accept or reject the certificates.

In some implementations, the walls of entities may include message boards on which entities can leave messages for each other. The message module may be configured to enable entities to generate messages that can be left on walls. A given message may be directed to the entity corresponding to a wall on which the given message is left, and/or the wall of the entity may serve as a virtual location at which entities other than the entity corresponding to the wall leave messages for each other. For example, members of an organization or employees of a corporation or company may leave messages for each other on the wall of the organization or corporation/company.

The message module may be configured set a privacy level of messages to be set responsive to entry and/or selection of a privacy level by an entity for a message. The level of privacy assigned to the message may dictate which entities have access to the message. For example, if the level of privacy is low (e.g., public), the message may be viewed on the wall on which the message is left by any entities that access the wall. If the level of privacy is high (e.g., private), the message may be viewable on the wall of the entity by other entities that are associated with the entity corresponding to the wall (and/or the entity that generated the message, and/or the target entity), but may be hidden on the wall from other entities that are not associated with the entity corresponding to the wall. This example of a purely public/private implementation is not intended to be limiting.

The addition of an message to a wall may result in a notification being provided to entities that are friends of the entity posting the message, friends of the entity corresponding to the wall on which the message was posted, friends of the target entity, and/or friends of other entities associated with the message. The entities to which the notification is provided may be filtered based on associations between the entity posting the message, the entity corresponding to the wall, and/or the target entity. For example, the filtering may be performed similarly to the discussion above of the accessibility of the message for only some entities, based on the privacy level of the message and the associations between the other entities and the entity corresponding to the wall. The entities that receive the notification may be the same entities that are able to access (or view) the message on the wall.

Control over the privacy level of individual messages may enable the accessibility of messages entered by an entity to be set on a per-message basis. The various levels of privacy may further enable customization of the level of access provided to different sets of other entities for the individual messages. This may provide enhanced control over the access for the entity posting the message, with respect to conventional social networks that may not provide for such a granular approach to privacy.

The ratings module may be configured to enable entities to rate other entities, the walls, achievements, certificates, content, and/or messages of other entities, and/or other aspects of other entities in the social network. The ratings received by entities from other entities on the social network may be displayed in their walls. The ratings of aspects of entities and/or their walls or profiles in the system may include ratings made in accordance with a binary rating scheme (e.g., thumbs-up/thumbs-down), and/or ratings made in accordance with a more nuanced rating scheme (e.g., letter grades, 1-10, and/or other rating schemes).

The ratings module may be configured to provide a user interface to entities through which entities submit ratings of other entities. The ratings submitted by an entity may be limited, in order to provide a value to ratings received from the entity. For example, the entity may periodically receive a supply of ratings that can be distributed, the entity may purchase ratings that may be distributed, and/or scarcity and/or value of ratings may otherwise be established. In a binary ratings scheme (e.g., thumbs up/thumbs down), the number of ratings (e.g., positive and/or negative) distributed may be limited such that the entity has a finite number of positive and/or negative ratings available for distribution to rate other entities, their walls, messages, achievements, certificates, and/or other features. The ratings module may provide for the purchase of more available ratings, and/or may dispense additional available ratings at intervals.

The ratings distributed from an entity to rate other entities, their walls, messages, achievements, certificates, and/or other features, may indicate the distributing entity. As such, a positive (e.g., thumbs-up) rating distributed from a distributing entity to indicate approval of, for example, a certificate or achievement of another entity may be reflected on the wall of the entity receiving the rating as being distributed by the distributing entity.

The ratings module may enable a distributing entity to select or enter a privacy level for ratings distributed to other entities. The privacy level may dictate which entities outside of the entity receiving the rating will be able to view the indication that the rating is from the distributing entity on the wall of the entity receiving the rating. By way of non-limiting example, if the privacy level for the rating is high (e.g., private), entities that are not associated with the distributing entity may not be able to view the indication that the rating is from the distributing entity on the wall of the entity receiving the rating, while entities that are associated with the distributing entity may be provided with views of the wall of the entity receiving the rating that indicate the rating was provided by the distributing entity. However, if the privacy level is low (e.g., public) the view of the wall of the entity receiving the rating may indicate the rating is from the distributing entity without regard for whether the entity viewing the wall is associated with the distributing entity.

The ratings module may be configured to determine a rating level of entities on the social network based on the ratings received by the entities. By way of non-limiting example, in a binary rating scheme, positive ratings received by an entity may be added and negative ratings received by the entity may be subtracted to determine a rating level for the entity. Other aggregation techniques may be used to determine the rating level from received ratings. In some implementations, ratings that have been given a high privacy level (e.g., private ratings) are included in determining the rating level of the entity that received the rating, even if an indication as to the source of the rating is not made available to the general public on the wall of the entity. The ratings module may be configured such that an indication of the rating level of the entity may be provided on the wall of the entity.

In some implementations, the ratings module may be configured to organize or rank entities based on the ratings that they have received. For example, the ratings module may order entities based on their respective ratings. These orderings may be inclusive across the social network, and/or may be segmented (e.g., according to common friends, category, associated with an entity, based on demographic entity information, and/or otherwise segmented). The organization and/or ranking of entities based on rankings may be performed on rating levels that aggregate all (or substantially all) received rankings. The organization and/or ranking of entities based on rankings may be performed using only ratings distributed from a particular distributing entity or set of distributing entities. These organizations and/or rankings may provide for an internal hierarchy of entities that is internal to the distributing entity or set of entities. An internal hierarchy of entities may be displayed on the wall of a corresponding distributing entity.

The ratings module may be configured to receive entry or selection from a distributing entity for an internal hierarchy of entities. The privacy level may dictate which entities outside of the distributing entity will be able to view the internal hierarchy of entities on the wall of the distributing entity. By way of non-limiting example, if the privacy level for the rating is high (e.g., private), entities that are not associated with the distributing entity may not be able to view the internal hierarchy on the wall of the distributing entity, while entities that are associated with the distributing entity may be provided with views of the wall of the distributing entity that include the internal hierarchy of entities. However, if the privacy level is low (e.g., public) the view of the wall of the distributing entity may include the internal hierarchy without regard for whether the entity viewing the wall is associated with the distributing entity.

The categories module may be configured to manage the categories on the system. This may include adding, deleting, and/or editing categories across the system. The management of the categories may include associating content, entities, achievements, certificates, messages, groups, and/or other aspects of the social network with categories. The grouping of content, entities, achievements, certificates, messages, groups, and/or other aspects of the social network may be performed automatically by the categories module by system administrators, and/or by the entities themselves.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
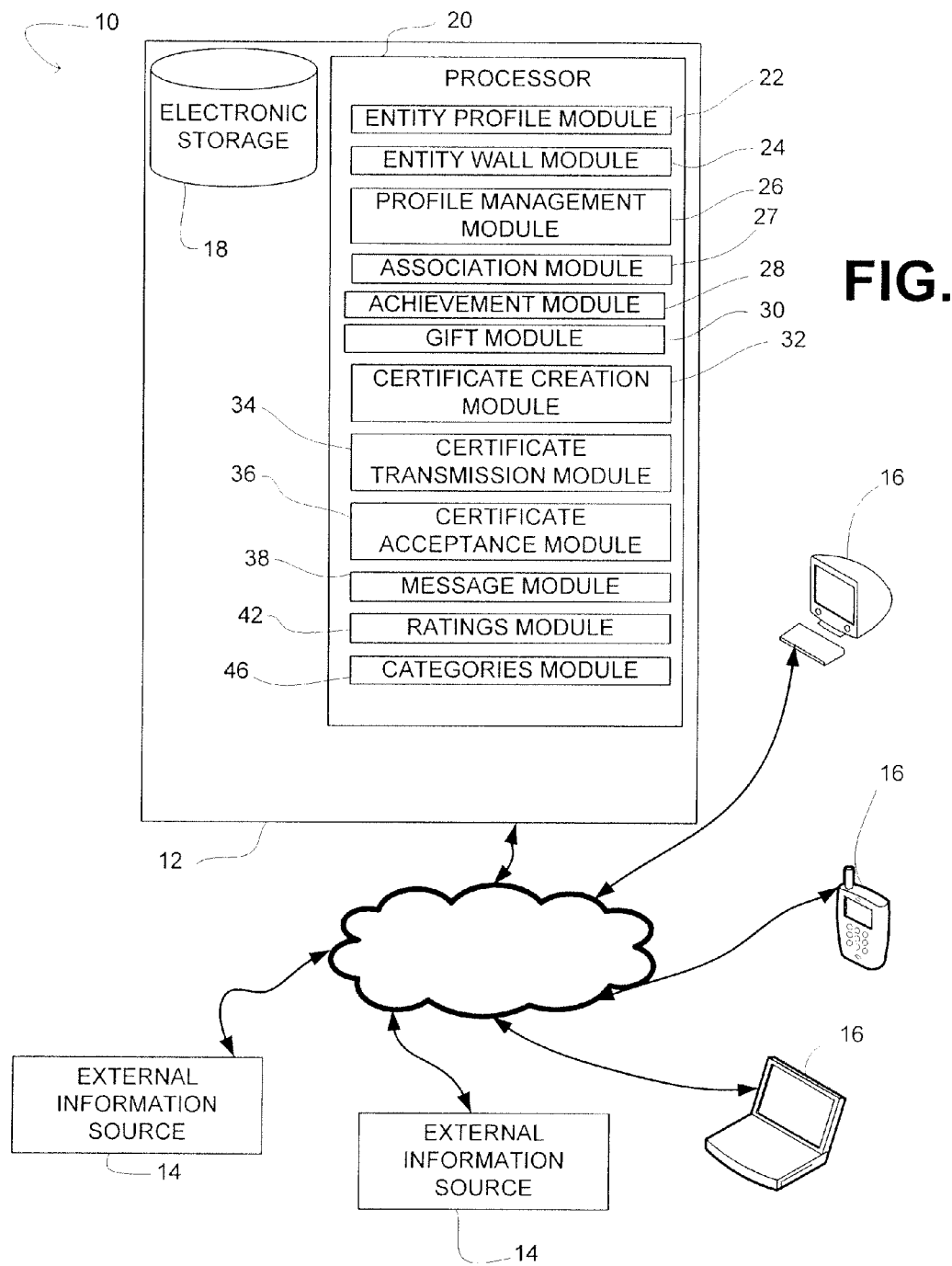
FIG. 1 illustrates a system configured to provide a social network website to users, in accordance with one or more embodiments of the invention.

FIG. 1 illustrates a system 10 configured to provide a social network website to users. The social network website may be themed toward achievements and/or accomplishments of users. As such, the social network may provide users with a unitary platform over which users can share a variety of different accomplishments of a variety of different accomplishment types, in a variety of categories, and/or involving a variety of different entities. Users may further observe accomplishments or achievements of other users via the social network despite the disparate nature of the accomplishments, accomplishment types, categories of activities involved in the accomplishments, and/or the entities involved in the accomplishments.

The system may provide a mechanism by which entities (e.g., organizations, universities, corporations, foundations, government departments, religious organizations, families, individuals, and/or other entities) can recognize, certify, and/or announce achievements by themselves and/or other entities. The system permits for individual control of the other entities that well have access to these recognitions, certifications, and/or announcements. It will be appreciated that discussions herein of actions attributed to an "entity" that is an organization, a university, a school, a corporation, a foundation, a government department, a religious organization, a family, a league, a partnership, and/or other group of individuals or groups may refer to actions taken in the social network (through system 10) by individuals on behalf of the entity. For example, an entity may have one or more administrators, leaders, representatives, and/or other individuals authorized to take actions within the social network on behalf of the entity.

As used herein, the term "social network website" may refer to a website providing a social network service. The social network service may include category divisions (e.g., for activities, achievements, individuals, groups, and/or other entities), mechanisms for communicatively connecting people and/or groups, a recommendation system linked to trust, profiles for individuals and/or groups involved in the social network service, and/or other features.

In some implementations, system 10 may include a server 12 and/or other components. The system 10 may leverage one or more external information sources 14. Entities may interface with system 10 and/or external information sources 14 via client computing platforms 16. The components of system 10, server 12, external information sources 14, and/or client computing platforms 16 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server 12, external information sources 14, and/or client computing platforms 16 are operatively linked via some other communication media.

A given client computing platform 16 may include one or more processors configured to execute computer program modules. The computer program modules may be configured to enable an entity associated with the given client computing platform 16 to interface with system 10 and/or external information sources 14, and/or provide other functionality attributed herein to client computing platforms 16. By way of non-limiting example, the given client computing platform 16 may include one or more of a desktop computer, a laptop computer, a handheld computer, a NetBook, a Smartphone, and/or other computing platforms.

The external information sources 14 may be configured to provide information to system 10. This information may include content, user information, information related to achievements or accomplishments of users, and/or other information.

Generally, server 12 may be configured to host webpages of the social networking website. The webpages may define views of the social network. The webpages may be transmitted by server 12 to client computing platforms 16, where client computing platforms 16 may render views of the social network defined by the received webpages. The webpages may be transmitted by server 12 based on requests to uniform resource locators associated with specific webpages. As used herein, the term "webpage" may refer to an electronic document or file. The electronic document or file may be suitable for transmission over the Internet (and/or other networks) and/or may be accessible by a web browser application executed on client computing platforms 16 such that views of the webpage are displayed on the accessing client computing platform 16. Webpages may be formatted in a mark-up language format, such as HTML, XML, XHTML, and/or other mark-up language formats.

The server 12 may include electronic storage 18, processor 20, and/or other components. It will be appreciated that the illustration of server 12 as a single device is not intended to be limiting. In some implementations, server 12 includes a plurality of devices that cooperate to perform some or all of the functionality attributed herein to server 12.

Electronic storage 18 may comprise electronic storage media that electronically stores information. The electronic storage media of electronic storage 18 may include one or both of system storage that is provided integrally (i.e., substantially non-removable) with server 12 and/or removable storage that is removably connectable to server 12 via, for example, a port (e.g., a USB port, a firewire port, etc.) or a drive (e.g., a disk drive, etc.). Electronic storage 18 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 18 may store software algorithms, information determined by processor 20, information received from external information sources 14, information received from client computing platforms 16, and/or other information that enables server 12 to function properly.

Processor 20 is configured to provide information processing capabilities in server 12. As such, processor 20 may include one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some implementations, processor 20 may include a plurality of processing units. These processing units may be physically located within the same device, or processor 20 may represent processing functionality of a plurality of devices operating in coordination.

As is shown in FIG. 1, processor 20 may be configured to execute one or more computer program modules. The one or more computer program modules may include one or more of an entity profile module 22, an entity wall module 24, a profile management module 26, an association module 27, an achievement module 28, a gift module 30, a certificate creation module 32, a certificate transmission module 34, a certificate acceptance module 36, a message module 38, a ratings module 42, a categories module 46, and/or other modules. Processor 26 may be configured to execute modules 22, 24, 26, 27, 28, 30, 32, 34, 36, 38, 42, and/or 46 by software; hardware; firmware; some combination of software, hardware, and/or firmware; and/or other mechanisms for configuring processing capabilities on processor 20.

It should be appreciated that although modules 22, 24, 26, 27, 28, 30, 32, 34, 36, 38, 42, and 46 are illustrated in FIG. 1 as being co-located within a single processing unit, in implementations in which processor 20 includes multiple processing units, one or more of modules 22, 24, 26, 27, 28, 30, 32, 34, 36, 38, 42, and/or 46 may be located remotely from the other modules. In implementations in which server 12 includes a plurality of devices operating in a coordinated manner to provide the functionality described herein with respect to processor 20, some or all of the functionality attributed to one or more of 22, 24, 26, 27, 28, 30, 32, 34, 36, 38, 42, and/or 46 may be provided by the modules executed on separate devices. The description of the functionality provided by the different modules 22, 24, 26, 27, 28, 30, 32, 34, 36, 38, 42, and/or 46 described below is for illustrative purposes, and is not intended to be limiting, as any of modules 22, 24, 26, 27, 28, 30, 32, 34, 36, 38, 42, and/or 46 may provide more or less functionality than is described. For example, one or more of modules 22, 24, 26, 27, 28, 30, 32, 34, 36, 38, 42, and/or 46 may be eliminated, and some or all of its functionality may be provided by other ones of modules 22, 24, 26, 27, 28, 30, 32, 34, 36, 38, 42, and/or 46. As another example, processor 20 may be configured to execute one or more additional modules that may perform some or all of the functionality attributed below to one of modules 22, 24, 26, 27, 28, 30, 32, 34, 36, 38, 42, and/or 46.

The entity profile module 22 is configured to manage entity profiles associated with entities that use system 10. The entity profiles may include identification information, contact information, login information, friendship information, product information, cause information, and/or other information. Identification information may identify the individual entities. For example the entity profile of a given entity may include the name of the corresponding entity (e.g., the name of a person, organization, university, corporation, foundation, government department, religious organization, and/or other entity type), a username of the corresponding entity, and/or other information identifying the entity. The contact information may include information that identifies how entities can be contacted. For example, the entity profile of the given entity may include a telephone number, a mailing address, an email address, an SMS account, a micro-blogging account (e.g., a Twitter® account), and/or other mechanisms for communicating with the given entity. Login information may include information used by entities to login to system 10 (e.g., password, and/or other login information). The friendship information may identifications of friendships between users (e.g., friendships, buddies, and/or other relationships).

The entity wall module 24 is configured to assemble webpages defining views of walls associated with individual entities. As used herein, the term "wall" may refer to a homepage of an entity in the social networking website that is accessible to other entities (e.g., the wall is outward facing). A wall may include information that an entity wants other entities to have access to. The webpages assembled by entity wall module 24 may be served to client computing platforms 16 in response to requests for the webpages.

Figure 2:
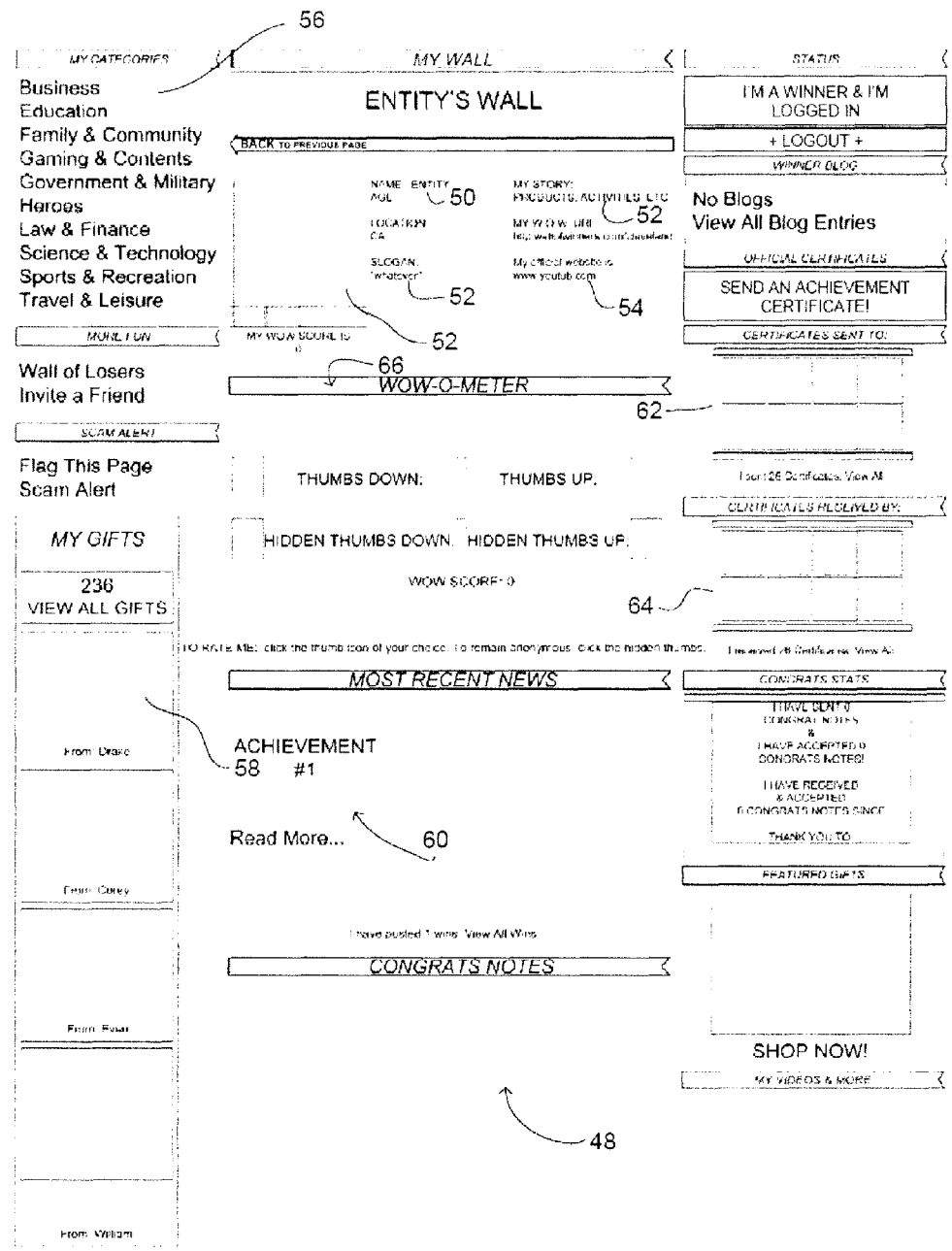
FIG. 2 illustrates a user interface provided by a social network website, according to one or more embodiments of the invention.

FIG. 2 is an exemplary illustration of a view of a wall 48 of an entity. The information displayed on wall 48 may include information identifying the entity 50, content 52 (e.g., photos, video, audio, prose) submitted by the entity, alternative information sources 54 about the entity (e.g., an outside uniform resource locator), and/or other information. The wall may include representations of categories 56 of activities, accomplishments, and/or achievements. Categories 56 may include categories of activities, accomplishments, and/or achievements in which the entity participates and/or has an interest in. Wall 48 may include representations of gifts 58 given to the entity by other entities. Wall 48 may include representations of achievements 60 performed by the entity, or in which the entity was involved. The achievements 60 may include achievements relevant to the entity but that have been performed by other entities. The wall 48 may include representations of certificates. These may include certificates 62 issued by the entity and/or certificates 64 received by the entity.

The wall 48 may include representations of ratings 66 by other entities of wall 48, the entity associated with wall 48, content 52, achievements 60, gifts 58, certificates 62 issued by the entity, certificates 64 received by the entity, and/or other information available on wall 48 or system 10 generally. The ratings may reflect approval or disapproval, like or dislike, acceptance or rejection. In some implementations, ratings 66 include binary ratings (e.g., thumbs-up/thumbs-down). In some implementations, ratings 66 include ratings with more levels (e.g., letter grade, rating 1-10, and/or other ratings schemes).

At least some of the information presented on wall 48 may be selectively provided to a sub-set of the other entities that use the social network provided by system 10. The determination as to whether a given piece of information on wall 48 should be presented to a given entity may be made based on a privacy level assigned to the given piece of information, associations (or lack thereof) between the entity associated with wall 48, associations between entities that have contributed to the information on wall 48 (e.g., certificates 64), and/or other settings and/or associations.

Figure 3:
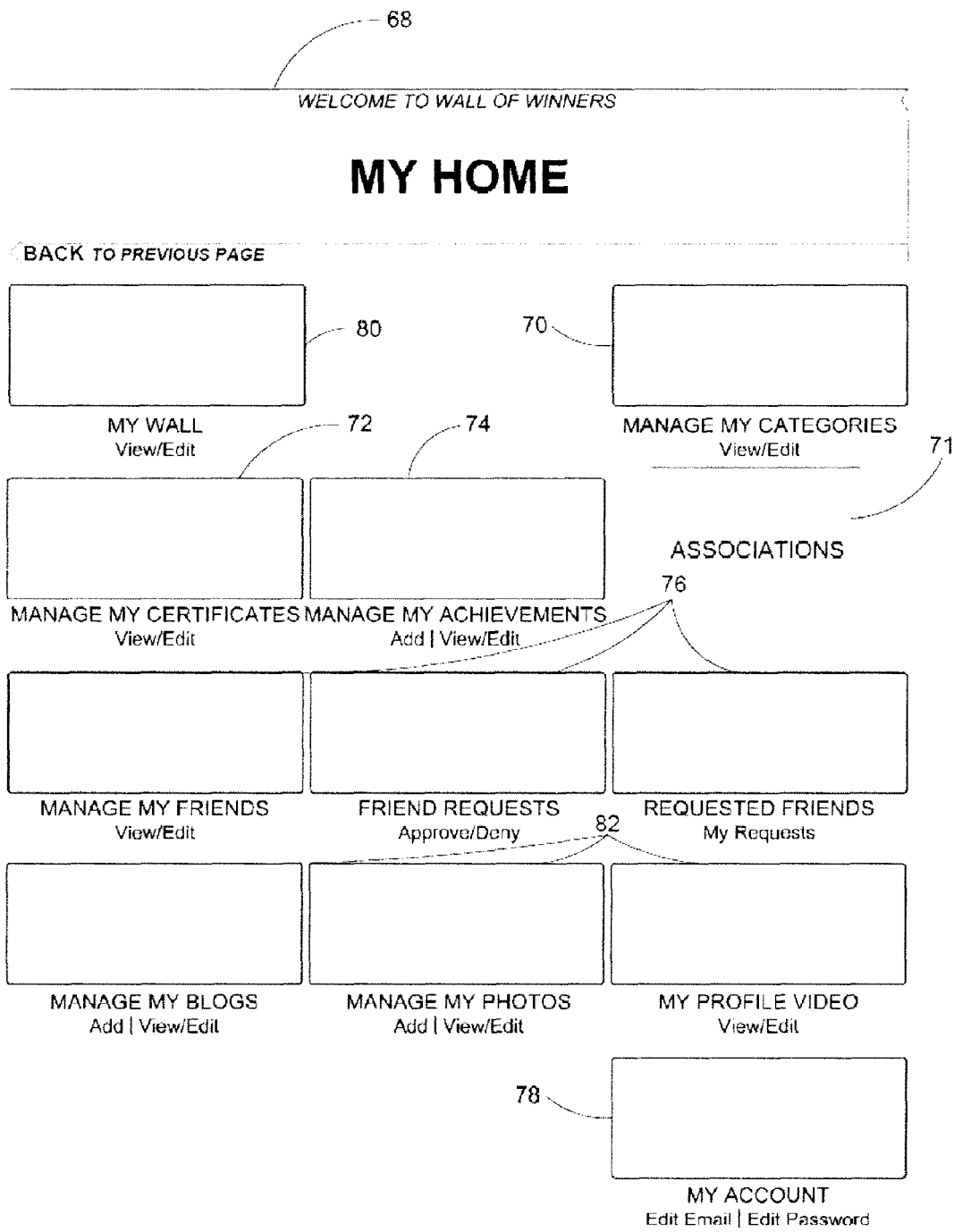
FIG. 3 illustrates a user interface provided by a social network website, according to one or more embodiments of the invention.

Returning to FIG. 1, the profile management module 26 is configured to assemble webpages that include a user interface having selectable controls that enable entities to manage their profiles. For example, the user interface may enable entities to edit entity information, configure their walls, and/or otherwise manage their profiles. FIG. 3 is an exemplary illustration of a view 68 of a webpage assembled by profile management module 26 to enable an entity manage its profile. In particular, the view 68 of the webpage shown in FIG. 3 includes a plurality of selectable controls that can be selected by an entity to further manage its profile.

The selectable controls shown in view 68 may include a categories control 70, an associations control 71, a certificates control 72, an achievements control 74, one or more friendship controls 76, a user information control 78, a wall configuration control 80, a user content control 82, and/or other controls. Selection of categories control 70 may result in a webpage being served to the selecting entity that enables the entity to add, delete, and/or edit the categories that are associated with its profile (e.g., shown on his wall). Selection of associations control 71 may result in a webpage being served to the selecting entity that enables the entity to request, accept, reject, modify, and/or otherwise manage associations with other entities. Selection of certificates control 72 may result in a webpage being served to the selecting entity that provides the entity with controls to add, delete, edit, manage privacy settings, and/or otherwise manage certificates associated with its profile (e.g., shown on its wall, sent to other entities, and/or other certificates). Selection of achievements control 74 may result in a webpage being served to the selecting entity that provides the user with controls to add, delete, edit achievements, manage privacy settings, and/or otherwise manage achievements associated with its profile (e.g., shown on his wall). Selection of one of friendship controls 76 may result in some action being taken with respect to the friendships associated with the entity's profile (e.g., accepting a friendship, rejecting a friendship, and/or other actions). Selection of one of friendship controls 76 may result in a webpage being served to the entity that provides the user with controls to add, delete, and/or edit friendships. Selection of entity information control 78 may result in a webpage being served to the entity that provides the entity with controls to edit entity information. Selection of wall configuration control 80 may result in a webpage being served to the entity that provides the entity with controls to configure (or reconfigure) his wall. This may include adding items to the wall, deleting items from the wall, rearranging the positions of items on the wall, and/or other actions. Selection of entity content control 82 may result in a webpage being served to the entity that provides the entity with controls to add, delete, and/or edit content associated with the entity's profile.

Turning back to FIG. 1, an association module 27 may be configured to manage associations between entities that participate in the social network. As used herein, the term "association" may refer to between relationships between entities that are associated with each other. Such associations may denote membership of an entity in another entity, employment of an entity by another entity, a fiduciary relationship between entities, and/or other associations. The webpages assembled by association module 27 (e.g., as discussed below) may be accessed by selection of association control 71 (shown in FIG. 3 and described above)

The association module 27 may be configured to receive requests for associations between entities. The requests may be received from requesting entities. The requests may be received through webpages served by server 12 to the entities that provide a user interface presented to the requesting entities. The user interface may enable a requesting entity to select or enter a responding entity (or entities).

In some implementations, a single entity may have several levels of associations. For example, a charitable organization may have tiered levels of associations based on amounts donated. As another example, a corporation may have a level of association for executives, a level of association for staff, a level of association for investors, and/or other levels of association. Other examples of entities having levels of association exist. If the association is being requested by for a responding entity that has a plurality of association levels, once the responding entity has been entered or selected, a menu enabling the requesting entity to request an appropriate level may be automatically populated.

The association module 27 may be configured to present requests for associations to responding entities. The requests for associations may be presented through a user interface provided to the responding entities in one or more web pages served by server 12. The user interface may present a request to a responding entity, including the requesting entity, and/or the association level requested, and may be configured to receive a response of the responding user (e.g., acceptance, rejection, modification, and/or other responses). The user interface may enable the responding entity to set the association level of the association before responding to the request. This may include modifying the association level designated by the requesting entity, and/or may include selection of an association level where none was previously designated in the request.

The association module 27 may be configured to provide the responses of the responding entities to the requesting entities. The association module 27 may further store and/or cause storage (e.g., by entity profile module 22) of the associations.

Achievement module 28 may be configured to enable entities to manage achievements. The achievements of a given entity may include the achievements of the entity posted on the wall of the entity, and/or achievements of the entity posted on the wall of other entities. As such, achievement module 28 may be configured to assemble webpages that provide controls to users by which users can add, delete, and/or edit achievements. The webpages assembled by achievement module 28 may be accessed by selection of achievements control 74 (shown in FIG. 3 and described above).

Figure 4:
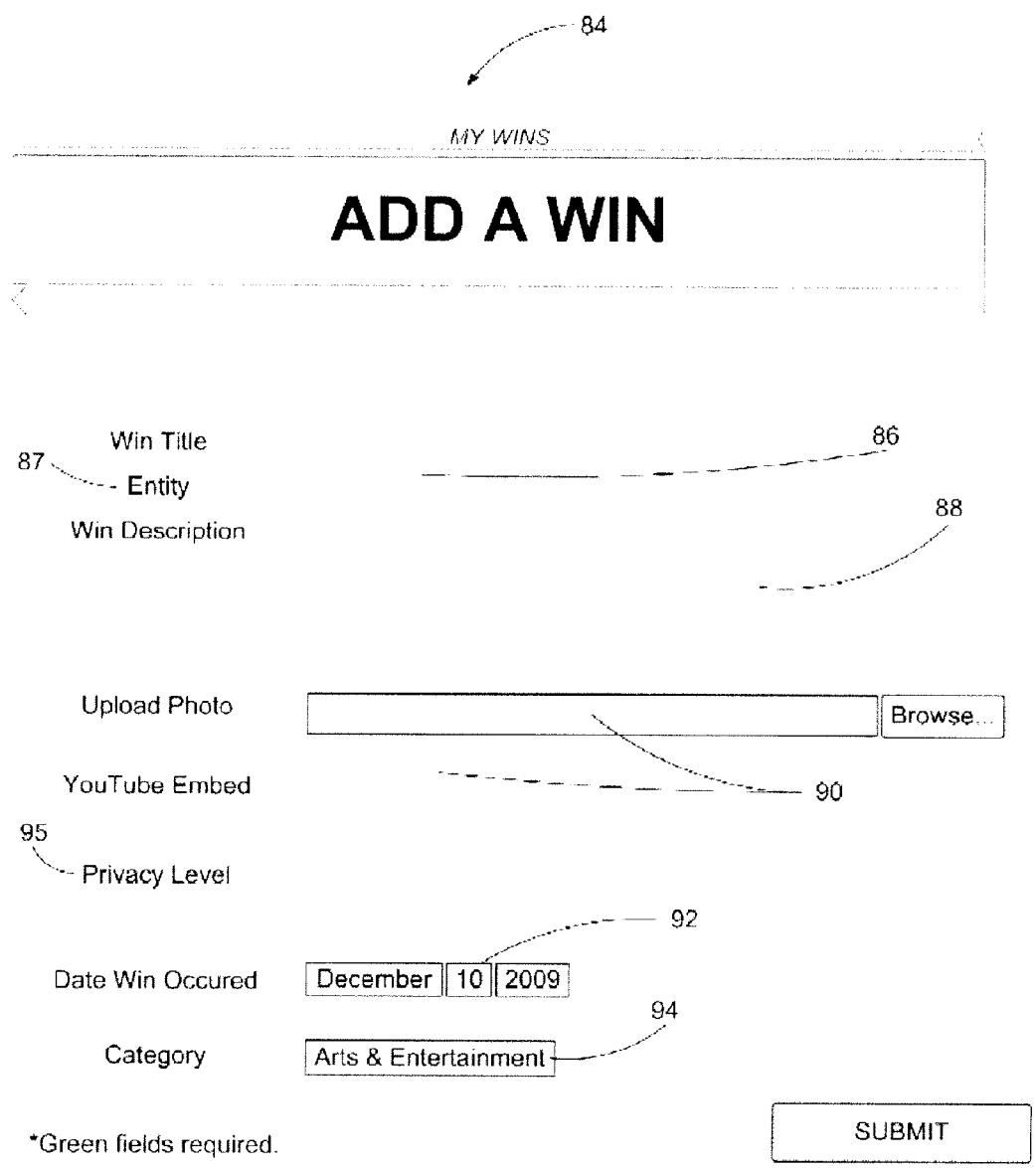
FIG. 4 illustrates a user interface provided by a social network website, according to one or more embodiments of the invention.

FIG. 4 is an exemplary illustration of a view 84 of a webpage that provides controls to an entity by which the entity can add an achievement to its profile and/or wall. The view 84 may include a title field 86, an entity identification field 87, a description field 88, digital content entry controls 90, a date selection control 92, a category selection control 94, a privacy setting 95, and/or other controls. The title field 86 may be configured to receive a title for the achievement from the entity. The entity description field 87 may be configured to receive an enumeration of the entities involved in the achievement. This may include the entity adding the achievement to its wall, entities associated with the entity adding the achievement (e.g., employees of the entity adding the achievement, members of the entity adding the achievement, and/or other entities). The description field 88 may be configured to receive a description of the achievement from the entity. The digital content entry controls 90 may be configured to enable the entity to provide digital content (e.g., images, video, audio, and/or other digital content) associated with the achievement to system 10. The date selection control 92 may be configured to receive a date associated with the achievement from the entity. The category selection control 94 may be configured to receive a category in which the achievement should be grouped. The privacy setting 95 may indicate the level of privacy for the achievement.

The level of privacy assigned to the achievement (e.g., by virtue of privacy setting 95) may dictate which entities have access to the achievement. For example, if the level of privacy is low (e.g., public), the achievement may be viewed on the wall of the entity by any entities that access the wall. If the level of privacy is high (e.g., private), the achievement may be viewable on the wall of the entity by other entities that are associated with the entity posting the achievement, but may be hidden on the wall from other entities that are not associated with the entity posting the achievement. This example of a purely public/private implementation is not intended to be limiting. The privacy setting 95 may be further graduated so that the achievement is hidden or accessible not only based on whether an entity is associated with the entity posting the achievement, but also the level of the association. For example, in a corporation, the privacy setting 95 of an achievement may set so that the achievement is viewable by executives and investors of the entity posting the achievement, but may remain hidden from staff and the general public.

The addition of an achievement to a wall through view 84 may result in a notification being provided to entities that are friends of the entity posting the achievement, and/or friends of the entity that is associated with the achievement. The entities to which the notification is provided may be filtered based on associations between the entities and the entity posting the achievement. For example, the filtering may be performed similarly to the discussion above of the accessibility of the achievement for only some entities, based on privacy setting 95 and the associations between the other entities and the entity posting the achievement. The entities that receive the notification may be the same entities that are able to access (or view) the achievement on the wall of the entity posting the achievement.

The privacy setting 95 may enable the accessibility of achievements entered by an entity through the user interface provided by view 84 to be set on a per-achievement basis. The various levels of privacy may further enable customization of the level of access provided to different sets of other entities for the individual achievements. This may provide enhanced control over the access for the entity posting the achievements to its wall, with respect to conventional social networks that may not provide for such a granular approach to privacy.

Returning to FIG. 1, the gift module 30 may be configured to enable entities to buy and/or send gifts (or prizes) to each other. To accomplish this, gift module 30 may be configured to assemble webpages including selectable controls by which an entity purchases and/or configures a virtual gift for another entity. The selectable controls may further include controls for indicating the entity to which a given gift should be sent, and controls to initiate sending of the gift. The selectable controls may include controls by which the entity giving the gift pays for the virtual gift. The virtual gift may be purchased with virtual currency, real world currency, and/or other consideration.

The gift module 30 may be configured to receive selection or entry by the entity sending the gift of a privacy level for the gift. The privacy level may dictate which entities outside of the entity receiving the gift will be able to view the gift (or evidence of the gift) on the wall of the entity receiving the gift. By way of non-limiting example, if the privacy level for the gift is high (e.g., private), entities that are not associated with the entity giving the gift may not be able to view the gift on the wall of the entity receiving the gift, while entities that are associated with the entity giving the gift are provided with views of the wall of the entity receiving the gift that include the gift. However, if the privacy level is low (e.g., public) view of the wall of the entity receiving the gift may include the gift without regard for whether the entity viewing the wall is associated with the entity that gave the gift.

The gift module 30 may be configured such that the entity giving a gift can adjust or customize the gift. The adjustment and/or customization may include adjusting and/or customizing the representation of the gift that is shown (to appropriate entities) on the wall of the entity receiving the gift. Such adjustment and/or customization may include adding designs and/or logos that correspond to the entity giving the gift and/or the entity receiving the gift. The adjustment and/or customization may include the addition of content (e.g., text, picture, video, audio, and/or other content) by the entity giving the gift.

The certificate creation module 32 may be configured to assemble webpages defining a user interface by which issuing entities can generate certificates for receiving entities. The certificates may affirm or certify achievements or activities by the receiving entities. The certificates may identify the corresponding issuing entities. The identification of the issuing entity in a certificate may serve to verify the authenticity and/or value of the certificate. The certificate creation module 32 may be configured to receive selection or entry of a privacy setting for generated certificates. The privacy setting may dictate which entities are provided with views of the wall of the issuing and/or receiving entities that include indications of the certificates generated.

Figure 5:
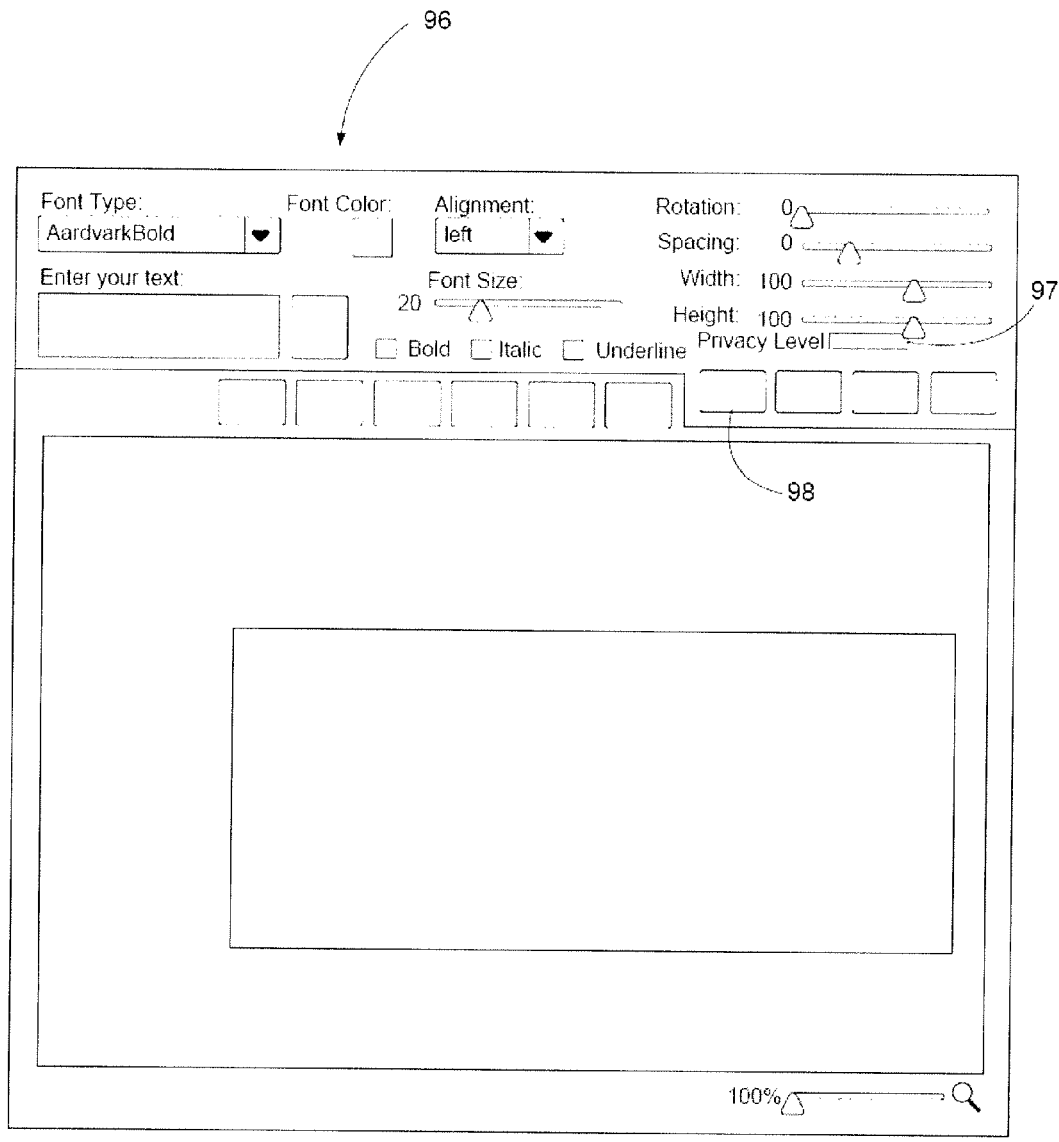
FIG. 5 illustrates a user interface provided by a social network website, according to one or more embodiments of the invention.

FIG. 5 illustrates an exemplary view 96 of a webpage defining the user interface by which issuing entities can generate certificates for receiving entities. As can be seen in FIG. 5, view 96 includes controls by which the issuing entity generating the certificate may customize the certificate. This may include entering content, such as text and/or images, to the certificate, configuring the content (e.g., position, size, orientation, color, font, and/or other configuration parameters), and/or otherwise controlling the appearance of the certificate. The view 96 may include controls 98 by which electronic files are uploaded so that content included in the electronic files will be included in the certificate. The view 96 may include controls by which the issuing entity may indicate a category for the certificate being created.

In some implementations, the user interface provided in view 96 may enable a issuing entity to attach vouchers to certificates being generated. The vouchers may be redeemable on the social network, in other virtual environments, in the real world, and/or otherwise redeemed. Vouchers redeemable on the social network may be redeemed for virtual goods on the social network (e.g., virtual gifts, accessories for a user's wall, and/or other virtual goods). Vouchers redeemable in the real world may be printed out and redeemed at brick-and-mortar retailers, and/or redeemed in the real world through other mechanisms. Access to a voucher may be provided via a uniform resource locator included in a certificate. By selecting the uniform resource locator, the receiving entity's browser may be directed to the uniform resource locator, at which the voucher is available.

In addition to creating certificates, the user interface provided in view 96 may be used to generate templates for certificates. For example, a template for a certain type of achievement, a template for certificates from a certain entity, a template for a specific receiving entity or set of entities, and/or other templates may be generated. Such templates may be used to streamline the generation of multiple certificates having similar features. In some implementations, templates created by one entity may be shared with other entities. This may include sharing templates with a specific set of one or more other entities, or sharing templates generally with other entities of the social network.

As can be seen in FIG. 5, the user interface provided within view 96 may include a control 97 by which the issuing entity may enter or select a privacy setting for a certificate (or template) being generated. Through control 97, the issuing entity may set the level of privacy for the certificate. The level of privacy assigned to the certificate (e.g., by virtue of privacy setting 97) may dictate which entities have access to the certificate on the wall of the receiving entity and/or the issuing entity.

For example, if the level of privacy is low (e.g., public), the certificate may be viewed on the wall of the receiving entity by any entities that access the wall. Similarly, if the level of privacy is low (e.g., public), an indication of the generation of the certificate by the issuing entity may be viewed on the wall of the issuing entity by any entities that access the wall. If the level of privacy is high (e.g., private), the certificate may be viewable on the wall of the receiving entity by other entities that are associated with the issuing entity, but may be hidden on the wall from other entities that are not associated with the issuing entity posting the achievement. Similarly, for a certificate with a high level of privacy, the indication on the wall of the issuing entity may only be viewable for other entities that are associated with the issuing entity, while for a certificate with a low level of privacy, the indication may be viewable without regard for associations with the issuing entity. This example of a purely public/private implementation is not intended to be limiting. The privacy setting 95 may be further graduated so that the certificates (and/or indications thereof) are hidden or accessible not only based on whether an entity is associated with the issuing entity, but also the level of the association. For example, in a corporation, the privacy setting 97 of an achievement may set so that the certificate (and/or the indication on the wall of the issuing entity) is viewable by executives and investors of the issuing entity, but may remain hidden from staff and the general public.

The generation of a certificate through view 96 may result in a notification being provided to entities that are friends of the receiving and/or issuing entities, and/or entities that are associated with the receiving and/or issuing entities. The entities to which the notification is provided may be filtered based on associations between the entities and the issuing entity. For example, the filtering may be performed similarly to the discussion above of the accessibility of the certificates for only some entities, based on privacy setting 97 and the associations between the other entities and the issuing entity. The entities that receive the notification may include the same entities that are able to access (or view) the certificate on the wall of the receiving entity. This may include transmitting the notification to entities that are friends of the receiving entity, and that are appropriately associated with the issuing entity.

The privacy setting 97 may enable the accessibility of certificates generated by an issuing entity through the user interface provided by view 96 to be set on a per-certificate basis. The various levels of privacy may further enable customization of the level of access provided to different sets of other entities for the individual certificates. This may provide enhanced control over the access for the issuing entity, with respect to conventional social networks that may not provide for such a granular approach to privacy. For example, a corporation and/or company may issue certificates for activities by employees that are internal to the corporation or company (e.g., leading salesperson, excellent customer service, project deadlines and/or budgets met, and/or other activities). By setting an appropriate privacy level for the certificates, the certificates on the walls of the receiving entities (the employees), and the indications of the certificates on the wall of the issuing entity (the corporation) may be viewable within the social network by other employees, investors, partners, and/or other suitable entities and maintained private from the general public.

Referring back to FIG. 1, certificate transmission module 34 may be configured to transmit generated certificates to the receiving entities. Transmission of a given certificate to a receiving entity may result in display of the transmitted certificate on the wall of receiving entity, in accordance with the privacy setting of the certificate (e.g., as described above). The certificates may be defined by certificate creation module 32 such that upon receiving a certificate, a receiving entity may print out a copy of the certificate that can be displayed in the real world (e.g., framed and hung).

The certificate acceptance module 36 may be configured to enable entities receiving certificates to accept or reject the certificates. For example, the certificate acceptance module 36 may assemble a webpage defining a view that includes a preview of a certificate transmitted to a given receiving entity by certificate transmission module 34. The view may include a preview of the certificate transmitted to the receiving entity, and selectable control(s) by which the receiving entity may selectively accept or reject the transmitted certificate.

In some implementations, the walls of users of system 10 may include message boards on which entities can leave messages for each other. The message module 38 may be configured to enable entities to generate messages that can be left on walls. A given message may be directed to the entity corresponding to a wall on which the given message is left, and/or the wall of the entity may serve as a virtual location at which entities other than the entity corresponding to the wall leave messages for each other. For example, members of an organization or employees of a corporation or company may leave messages for each other on the wall of the organization or corporation/company.

Figure 6:
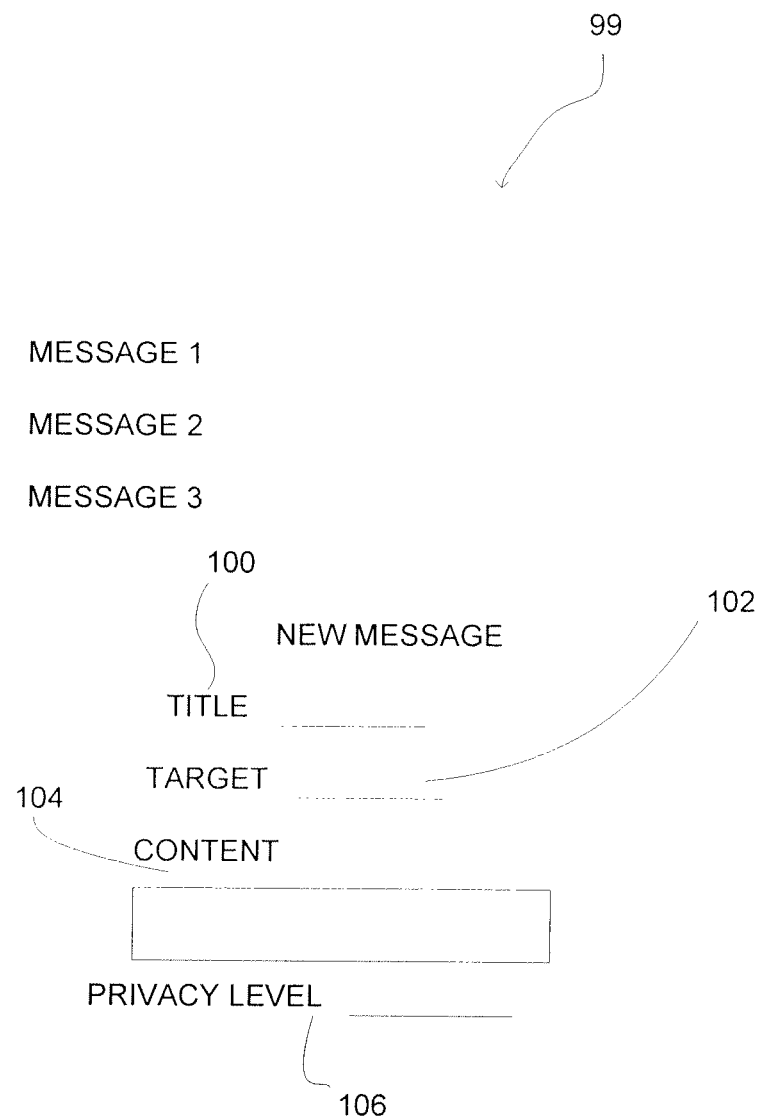
FIG. 6 illustrates a user interface provided by a social network website, according to one or more embodiments of the invention.

By way of non-limiting example, FIG. 6 illustrates a view 99 of a portion of a webpage providing a user interface through which entities can leave messages on the wall of on entity. The view 99 may include some or all of the wall of the entity corresponding to the wall. The user interface may include one or more of a title field 100, a target entity field 102, a content entry field 104, a privacy setting 106, and/or other controls or fields.

The title field 100 may be configured to receive the input of a title for the message being input. The target entity field 102 may be configured to receive the input of one or more target entities to which the message being generated is directed. This may include the entity corresponding to the wall on which the message is being generated, and/or other entities. The content entry field 104 may be configured to receive content form the entity generating the message for the target entity. The content may include, for example, text, audio (e.g., an uploaded audio file), still images (e.g., an uploaded image file), video (e.g., an uploaded video file), a link, and/or other content.

The privacy setting 106 may be configured to receive entry and/or selection of a privacy level for the message being generated. The level of privacy assigned to the message (e.g., by virtue of privacy setting 106) may dictate which entities have access to the message. For example, if the level of privacy is low (e.g., public), the message may be viewed on the wall on which the message is left by any entities that access the wall. If the level of privacy is high (e.g., private), the message may be viewable on the wall of the entity by other entities that are associated with the entity corresponding to the wall (and/or the entity that generated the message, and/or the target entity), but may be hidden on the wall from other entities that are not associated with the entity corresponding to the wall. This example of a purely public/private implementation is not intended to be limiting. The privacy setting 106 may be further graduated so that the message is hidden or accessible not only based on whether an entity is associated with the entity corresponding to the wall, but also the level of the association. For example, in a corporation, the privacy level set via privacy setting 106 may be set so that the message is viewable by executives and investors of the entity corresponding to the wall, but may remain hidden from staff and the general public. This may enable groups of entities associated with the entity corresponding to the wall to communicate in a semi-open manner on the social network.

The addition of an message to a wall through view 99 may result in a notification being provided to entities that are friends of the entity posting the message, friends of the entity corresponding to the wall on which the message was posted, friends of the target entity, and/or friends of other entities associated with the message. The entities to which the notification is provided may be filtered based on associations between the entity posting the message, the entity corresponding to the wall, and/or the target entity. For example, the filtering may be performed similarly to the discussion above of the accessibility of the message for only some entities, based on privacy setting 106 and the associations between the other entities and the entity corresponding to the wall. The entities that receive the notification may be the same entities that are able to access (or view) the message on the wall.

The privacy setting 106 may enable the accessibility of messages entered by an entity through the user interface provided by view 99 to be set on a per-message basis. The various levels of privacy may further enable customization of the level of access provided to different sets of other entities for the individual messages. This may provide enhanced control over the access for the entity posting the message, with respect to conventional social networks that may not provide for such a granular approach to privacy.

Returning to FIG. 1, in some implementations, entity wall module 24 and message module 38 may be configured such that the wall of an entity may include a portion that resembles a surface on which messages in the real world would be attached or affixed. For example, the surface may resemble a tackboard, a pegboard, a refrigerator door, and/or other surfaces that generally receive messages for attachment in the real world. The messages created for posting on such a wall may be posted to the wall by virtual fasteners that holds the messages in place on the surface. The virtual fasteners may resemble items in the real world that affix or attach messages to a surface like the one displayed on the wall. For example, the virtual fasteners may resemble one or more of tacks, pins, tape, magnets, stickers, and/or other items that affix or attach messages. An exemplary description of the attachment of messages to a surface on a wall with virtual fasteners may be found in U.S. patent application Ser. No. 12/683,694, filed Jan. 7, 2010, which is hereby incorporated by reference in its entirety into this disclosure.

The message module 38 may be configured such that the virtual fasteners are "branded". The virtual fasteners may include one or more virtual fasteners that are branded with a logo corresponding to an entity that uses system 10. The branded virtual fasteners may be used to post messages to the wall of the entity corresponding to the logo, the branded virtual fasteners may be used by the entity to post messages to the walls of other entities, and/or the branded virtual fasteners may be used to post other messages within the social network. Based on a privacy level of a message, the brand on the branded virtual fastener may not be viewable to all of the other entities that use the social network. For example, for a message with a high privacy level, entities that are not associated with the entity corresponding to the brand may not be able to view the brand.

In some implementations, the entity wall module 24 and the message module 38 may be configured such that the wall of an entity may include a surface to receive messages posted with virtual fasteners, and a separate area in which messages that are applied to the wall without virtual fasteners. In some implementations, the entity wall module 24 and the message module 38 may be configured such that the wall of the entity includes only one of a surface to receive messages posted with virtual fasteners, or a separate area in which messages that are applied to the wall without virtual fasteners.

Ratings module 42 may be configured to enable entities to rate other entities, the walls, achievements, certificates, content, and/or messages of other entities, and/or other aspects of other entities in the social network. The ratings received by entities may be displayed in their walls (e.g., as defined by the webpages assembled by user wall module 24). The ratings of aspects of entities and/or their walls or profiles in system 10 may include ratings made in accordance with a binary rating scheme (e.g., thumbs-up/thumbs-down), and/or ratings made in accordance with a more nuanced rating scheme (e.g., letter grades, 1-10, and/or other rating schemes).

The ratings module 42 may be configured to provide a user interface to entities (e.g., via a webpage served by server 12) through which entities submit ratings of other entities. The ratings submitted by an entity may be limited, in order to provide a value to ratings received from the entity. For example, the entity may periodically receive a supply of ratings that can be distributed, the entity may purchase ratings that may be distributed, and/or scarcity and/or value of ratings may otherwise be established. In a binary ratings scheme (e.g., thumbs up/thumbs down), the number of ratings (e.g., positive and/or negative) distributed may be limited such that the entity has a finite number of positive and/or negative ratings available for distribution to rate other entities, their walls, messages, achievements, certificates, and/or other features. The ratings module 42 may provide for the purchase of more available ratings, and/or may dispense additional available ratings at intervals.

The ratings distributed from an entity to rate other entities, their walls, messages, achievements, certificates, and/or other features, may indicate the distributing entity. As such, a positive (e.g., thumbs-up) rating distributed from a distributing entity to indicate approval of, for example, a certificate or achievement of another entity may be reflected on the wall of the entity receiving the rating as being distributed by the distributing entity.

The ratings module 42 may enable a distributing entity to select or enter a privacy level for ratings distributed to other entities. The privacy level may dictate which entities outside of the entity receiving the rating will be able to view the indication that the rating is from the distributing entity on the wall of the entity receiving the rating. By way of non-limiting example, if the privacy level for the rating is high (e.g., private), entities that are not associated with the distributing entity may not be able to view the indication that the rating is from the distributing entity on the wall of the entity receiving the rating, while entities that are associated with the distributing entity may be provided with views of the wall of the entity receiving the rating that indicate the rating was provided by the distributing entity. However, if the privacy level is low (e.g., public) the view of the wall of the entity receiving the rating may indicate the rating is from the distributing entity without regard for whether the entity viewing the wall is associated with the distributing entity.

The ratings module 42 may be configured to determine a rating level of entities on the social network based on the ratings received by the entities. By way of non-limiting example, in a binary rating scheme, positive ratings received by an entity may be added and negative ratings received by the entity may be subtracted to determine a rating level for the entity. Other aggregation techniques may be used to determine the rating level from received ratings. In some implementations, ratings that have been given a high privacy level (e.g., private ratings) are included in determining the rating level of the entity that received the rating, even if an indication as to the source of the rating is not made available to the general public on the wall of the entity. The ratings module 42 may be configured such that an indication of the rating level of the entity may be provided on the wall of the entity (e.g., ratings 66 shown in FIG. 2 and described above).

In some implementations, ratings module 42 may be configured to organize or rank entities based on the ratings that they have received. For example, ratings module 42 may order entities based on their respective ratings. These orderings may be inclusive across the social network, and/or may be segmented (e.g., according to common friends, category, associated with an entity, based on demographic entity information, and/or otherwise segmented). The organization and/or ranking of entities based on rankings may be performed on rating levels that aggregate all (or substantially all) received rankings. The organization and/or ranking of entities based on rankings may be performed using only ratings distributed from a particular distributing entity or set of distributing entities. These organizations and/or rankings may provide for an internal hierarchy of entities that is internal to the distributing entity or set of entities. An internal hierarchy of entities may be displayed on the wall of a corresponding distributing entity.

The ratings module 42 may be configured to receive entry or selection from a distributing entity for an internal hierarchy of entities. The privacy level may dictate which entities outside of the distributing entity will be able to view the internal hierarchy of entities on the wall of the distributing entity. By way of non-limiting example, if the privacy level for the rating is high (e.g., private), entities that are not associated with the distributing entity may not be able to view the internal hierarchy on the wall of the distributing entity, while entities that are associated with the distributing entity may be provided with views of the wall of the distributing entity that include the internal hierarchy of entities. However, if the privacy level is low (e.g., public) the view of the wall of the distributing entity may include the internal hierarchy without regard for whether the entity viewing the wall is associated with the distributing entity.

The categories module 46 may be configured to manage the categories on system 10. This may include adding, deleting, and/or editing categories across system 10. The management of the categories may include associating content (e.g., content received from external information sources 14), entities, achievements, certificates, messages, groups, and/or other aspects of the social network with categories. The grouping of content (e.g., content received from external information sources 14), entities, achievements, certificates, messages, groups, and/or other aspects of the social network may be performed automatically by categories module 46, by system administrators, and/or by the users themselves.

It will be appreciated that for entities that include more than one person or user of the social network, one or more users may interact with system 10 (e.g., through the user interfaces and/or other functionalities described herein) on behalf of the group. These one or more users may be considered to be "administrators" on behalf of the entity. For example, an administrator of an entity may, on behalf of the entity, manage the profile of the entity, give and/or receive gifts, certificates, and/or messages for the entity, post achievements for the entity, distribute ratings for the entity, and/or perform other tasks or functions attributed herein to the individual entity.

Figure 7:
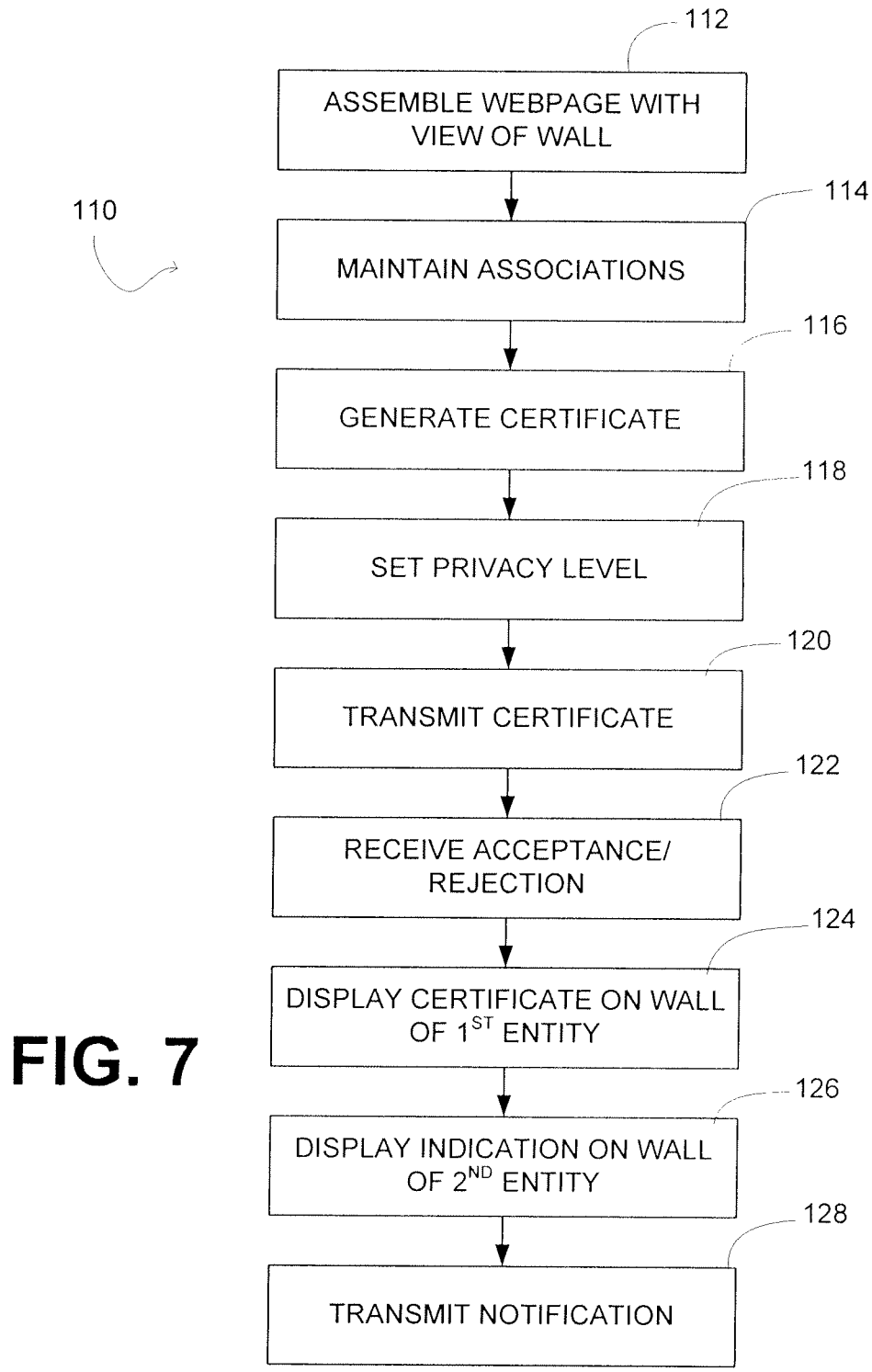
FIG. 7 illustrates a method of hosting a social networking website, in accordance with one or more embodiments of the invention.

FIG. 7 illustrates a method 110 of hosting a social network, including providing certificates between entities using the social network. The operations of method 110 presented below are intended to be illustrative. In some embodiments, method 110 may be accomplished with one or more additional operations not described, and/or without one or more of the operations discussed. Additionally, the order in which the operations of method 110 are illustrated in FIG. 7 and described below is not intended to be limiting.

In some embodiments, method 110 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 110 in response to instructions stored electronically on an electronic storage medium. The one or more processing devices may include one or more devices configured through hardware, firmware, and/or software to be specifically designed for execution of one or more of the operations of method 110.

At an operation 112, a view of a wall of a first entity in a social network may be provided. The view of the wall may be provided by serving webpages from a server to one or more client computing platforms. In some implementations, operation 112 may be performed by an entity wall module similar to or the same as entity wall module 24 (shown in FIG. 1 and described above).

At an operation 114, associations between entities that use the social network may be maintained. In some implementations, operation 114 may be performed by an association module similar to or the same as association module 27 (shown in FIG. 1 and described above).

At an operation 116, a certificate for the first entity may be generated. The certificate may be generated in response to a request and/or other inputs from a second entity using the social network. The certificate may be to affirm activities and/or achievements of the first entity. The certificate may include an indication that it has been generated in response to a request and/or other inputs from the second entity. In some implementations, operation 116 may be performed by a certificate creation module similar to or the same as certificate creation module 32 (shown in FIG. 1 and described above).

At an operation 118, a privacy level of the certificate may be set. The privacy level of the certificate may be set in accordance with selection and/or entry of the privacy level by the second entity. In some implementations, operation 118 may be performed by a certificate creation module similar to or the same as certificate creation module 32 (shown in FIG. 1 and described above).

At an operation 120, the certificate may be transmitted to the first entity. In some implementations, operation 120 may be performed by a certificate transmission module similar to or the same as certificate transmission module 34 (shown in FIG. 1 and described above).

At an operation 122, an acceptance or rejection of the certificate may be received from the first entity. In some implementations, operation 122 may be performed by a certificate acceptance module similar to or the same as certificate acceptance module 36 (shown in FIG. 1 and described above).

At an operation 124, responsive to acceptance of the certificate by the first entity at operation 122, the certificate may be included in views of the wall of the first entity. This may include making the certificate viewable on the wall of the first entity in accordance with the privacy level set for the certificate at operation 118 and/or the associations between the second entity and other entities using the social network maintained at operation 114. For example, responsive to the privacy level being set high (e.g., private), the certificate may be viewable on the wall of the first entity by entities associated (or having an appropriately high level of association) with the second entity, while the certificate may be hidden for entities not associated (or having an appropriately high level of association) with the second entity. On the other hand, responsive to the privacy level being set low (e.g., public), the certificate may be viewable on the wall of the first entity for other entities without regard for associations with the second entity.

At an operation 124, an indication of the generation and/or acceptance of the certificate may be displayed on the wall in the social network associated with the second entity. The display of the indication on the wall of the second entity may be dependent on the privacy level set for the certificate and/or associations between the second entity and other entities maintained at operation 114. For example, responsive to the privacy level of the certificate being set high (e.g., private), the indication may be viewable on the wall of the second entity by entities associated (or having an appropriately high level of association) with the second entity, while the indication of the certificate may be hidden for entities not associated (or having an appropriately high level of association) with the second entity. On the other hand, responsive to the privacy level being set low (e.g., public), the indication of the certificate may be viewable on the wall of the second entity for other entities without regard for associations with the second entity.

At an operation 128, notification of the certificate may be transmitted to entities other than the first entity and the second entity. The notifications may be transmitted to other entities having a requisite relationship (e.g., friendship, buddies, follower, and/or other relationships) with the first entity and/or the second entity. The notifications may further be filtered based on the privacy level of the certificate and/or the associations of the other entities with the second entity. For example, responsive to the privacy level of the certificate being set high (e.g., private), the notification may be provided only to entities having the requisite relationship with the first entity and/or the second entity, and being associated (or having an appropriately high level of association) with the second entity. On the other hand, responsive to the privacy level being set low (e.g., public), the notification of the certificate may be provided to all of the entities having the requisite relationship with the first entity and/or the second entity.

Figure 8:
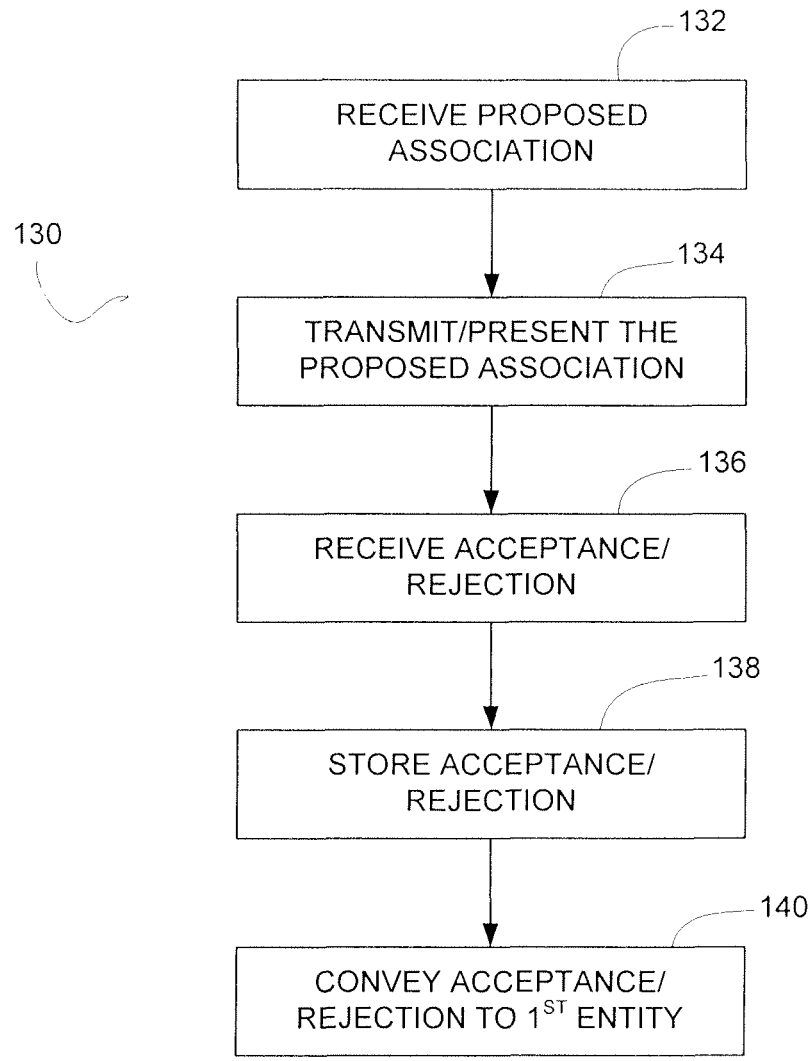
FIG. 8 illustrates a method of hosting a social networking website, in accordance with one or more embodiments of the invention.

FIG. 8 illustrates a method 130 of hosting a social network, including maintaining associations between entities using the social network. The operations of method 130 presented below are intended to be illustrative. In some embodiments, method 130 may be accomplished with one or more additional operations not described, and/or without one or more of the operations discussed. Additionally, the order in which the operations of method 130 are illustrated in FIG. 8 and described below is not intended to be limiting.

In some embodiments, method 130 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 130 in response to instructions stored electronically on an electronic storage medium. The one or more processing devices may include one or more devices configured through hardware, firmware, and/or software to be specifically designed for execution of one or more of the operations of method 130.

At an operation 132, a first entity may propose an association with a second entity. The proposal of the first entity may be received via a user interface provided through webpages served to the first entity by a server hosting the social network. In some implementations, operation 132 may be performed by an association module similar to or the same as association module 27 (shown in FIG. 1 and described above).

At an operation 134, the proposed association may be transmitted and/or presented to the second entity. In some implementations, operation 134 may be performed by an association module similar to or the same as association module 27 (shown in FIG. 1 and described above).

At an operation 136, acceptance or rejection of the association by the second entity may be received. The acceptance or rejection may be received by a server hosting the social network. In some implementations, operation 136 may be performed by an association module similar to or the same as association module 27 (shown in FIG. 1 and described above).

At an operation 138, the acceptance or rejection received at operation 136 may be stored for later use. In some implementations, operation 138 may be performed by an association module similar to or the same as association module 27 (shown in FIG. 1 and described above).

At an operation 140, the acceptance or rejection received at operation 136 may be conveyed to the first entity. The acceptance or rejection may be conveyed to the first entity by a server hosting the social network. In some implementations, operation 140 may be performed by an association module similar to or the same as association module 27 (shown in FIG. 1 and described above).

Figure 9:
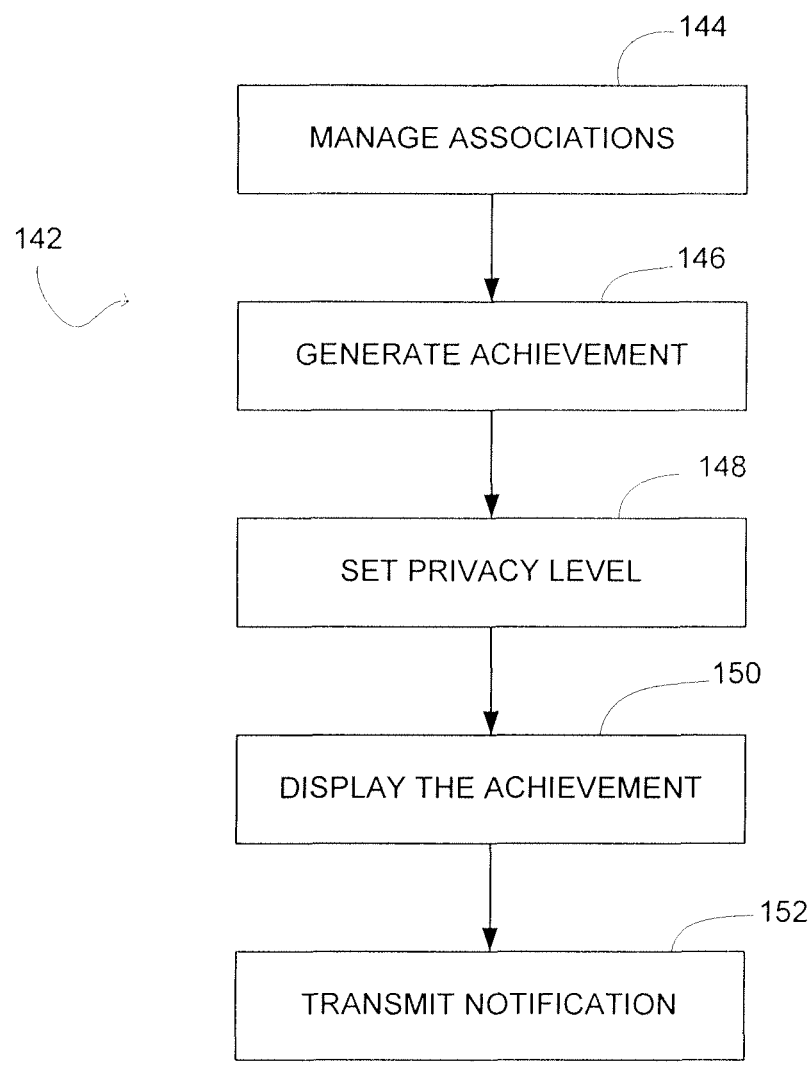
FIG. 9 illustrates a method of hosting a social networking website, in accordance with one or more embodiments of the invention.

FIG. 9 illustrates a method 142 of hosting a social network, including posting achievements of entities on the social network. The operations of method 142 presented below are intended to be illustrative. In some embodiments, method 142 may be accomplished with one or more additional operations not described, and/or without one or more of the operations discussed. Additionally, the order in which the operations of method 142 are illustrated in FIG. 9 and described below is not intended to be limiting.

In some embodiments, method 142 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 142 in response to instructions stored electronically on an electronic storage medium. The one or more processing devices may include one or more devices configured through hardware, firmware, and/or software to be specifically designed for execution of one or more of the operations of method 142.

At an operation 144, associations between entities that use the social network may be maintained. In some implementations, operation 144 may be performed by an association module similar to or the same as association module 27 (shown in FIG. 1 and described above).

At an operation 146, an achievement may be generated by a first entity. The achievement may represent an activity and/or accomplishment of the first entity. In some implementations, operation 146 may be performed by an achievement module similar to or the same as achievement module 28 (shown in FIG. 1 and described above).

At an operation 148, a privacy level of the achievement may be set. The privacy level of the achievement may be set in accordance with selection and/or entry of the privacy level by the first entity. In some implementations, operation 148 may be performed by an achievement module similar to or the same as achievement module 28 (shown in FIG. 1 and described above).

At an operation 150, the achievement may be made viewable on a wall in the social network of the first entity. Making the achievement viewable may include presenting an indication of the achievement in views of the wall served to entities using the social network in webpages. This may include making the achievement viewable on the wall of the first entity in accordance with the privacy level set for the achievement at operation 148 and/or the associations between the first entity and other entities using the social network maintained at operation 144. For example, responsive to the privacy level being set high (e.g., private), the achievement may be viewable on the wall of the first entity by entities associated (or having an appropriately high level of association) with the first entity, while the achievement may be hidden for entities not associated (or having an appropriately high level of association) with the first entity. On the other hand, responsive to the privacy level being set low (e.g., public), the achievement may be viewable on the wall of the first entity for other entities without regard for associations with the first entity.

At an operation 152, notification of the achievement may be transmitted to entities other than the first entity. The notification may be transmitted to other entities having a requisite relationship (e.g., friendship, buddies, follower, and/or other relationships) with the first entity. The notifications may further be filtered based on the privacy level of the achievement and/or the associations of the other entities with the first entity. For example, responsive to the privacy level of the achievement being set high (e.g., private), the notification may be provided only to entities having the requisite relationship with the first entity, and being associated (or having an appropriately high level of association) with the first entity. On the other hand, responsive to the privacy level being set low (e.g., public), the notification of the achievement may be provided to all of the entities having the requisite relationship with the first entity without regard for whether the entities are associated with the first entity.

Figure 10:
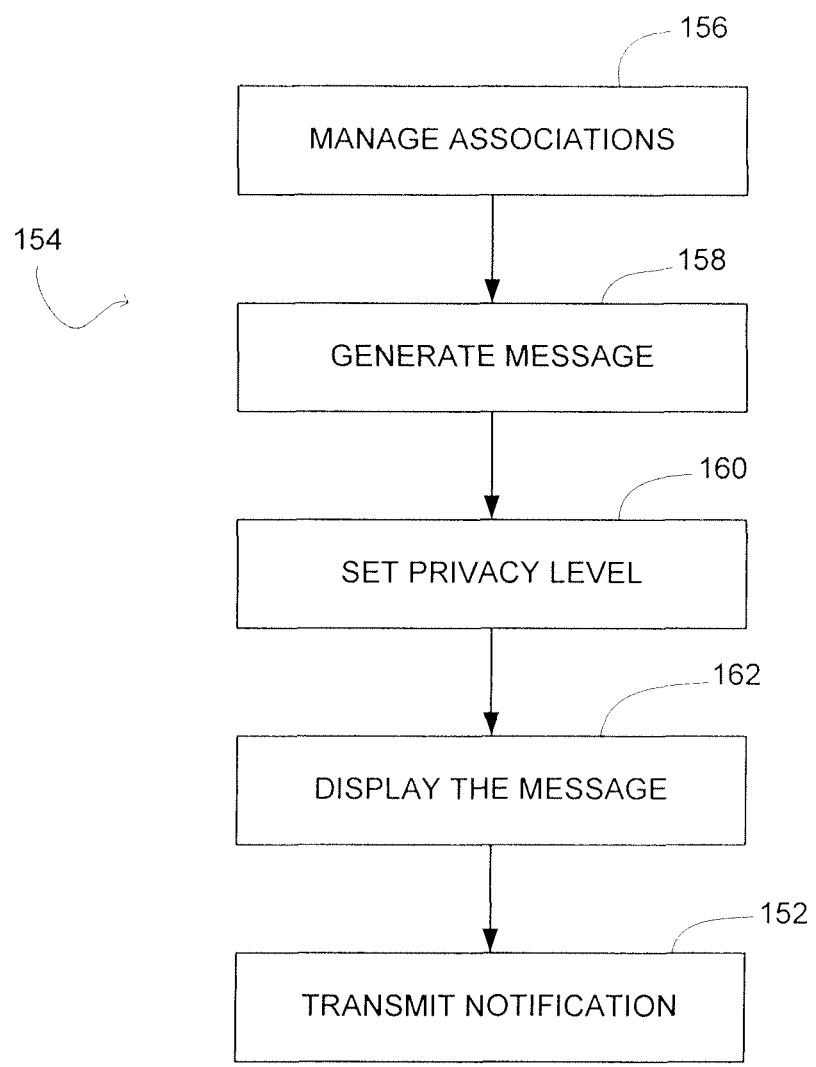
FIG. 10 illustrates a method of hosting a social networking website, in accordance with one or more embodiments of the invention.

FIG. 10 illustrates a method 154 of hosting a social network, including posting messages between entities on the social network. The operations of method 154 presented below are intended to be illustrative. In some embodiments, method 154 may be accomplished with one or more additional operations not described, and/or without one or more of the operations discussed. Additionally, the order in which the operations of method 154 are illustrated in FIG. 10 and described below is not intended to be limiting.

In some embodiments, method 154 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 154 in response to instructions stored electronically on an electronic storage medium. The one or more processing devices may include one or more devices configured through hardware, firmware, and/or software to be specifically designed for execution of one or more of the operations of method 154.

At an operation 156, associations between entities that use the social network may be maintained. In some implementations, operation 156 may be performed by an association module similar to or the same as association module 27 (shown in FIG. 1 and described above).

At an operation 158, a message may be generated in response to a request and/or other input from a first entity. The message may be generated for posting to a wall in the social network corresponding to a second entity. The message may be directed to the second entity, and/or to other entities. Generation of the message may include receiving content for the message from the first entity and/or receiving selection and/or entry from the first entity of the entity or entities to which the message is directed. In some implementations, operation 158 may be performed by a message module similar to or the same as message module 38 (shown in FIG. 1 and described above).

At an operation 160, a privacy level of the message may be set. The privacy level of the message may be set in accordance with selection and/or entry of the privacy level by the first entity. In some implementations, operation 160 may be performed by an achievement module similar to or the same as achievement module 28 (shown in FIG. 1 and described above).

At an operation 162, the message may be made viewable on the wall in the social network of the second entity. Making the message viewable may include presenting an indication of the message (e.g., including the message itself) in views of the wall served to entities using the social network in webpages. This may include making the indication of the message viewable on the wall of the second entity in accordance with the privacy level set for the achievement at operation 160 and/or the associations between the second entity and other entities using the social network maintained at operation 156. For example, responsive to the privacy level being set high (e.g., private), the message may be viewable on the wall of the second entity by entities associated (or having an appropriately high level of association) with the second entity, while the message may be hidden for entities not associated (or having an appropriately high level of association) with the second entity. On the other hand, responsive to the privacy level being set low (e.g., public), the message may be viewable on the wall of the second entity for other entities without regard for associations with the second entity.

At an operation 164, notification of the message may be transmitted to entities other than the first entity. The notification may be transmitted to other entities having a requisite relationship (e.g., friendship, buddies, follower, and/or other relationships) with the first entity, the second entity, and/or other entities to which the message is directed. The notifications may further be filtered based on the privacy level of the message and/or the associations of the other entities with the second entity. For example, responsive to the privacy level of the message being set high (e.g., private), the notification may be provided only to entities having the requisite relationship with the first entity, the second entity, and/or other entities to which the message is directed, and being associated (or having an appropriately high level of association) with the second entity. On the other hand, responsive to the privacy level being set low (e.g., public), the notification of the message may be provided to all of the entities having the requisite relationship with the first entity, the second entity, and/or other entities to which the message is directed without regard for whether the entities are associated with the second entity.

Figure 11:
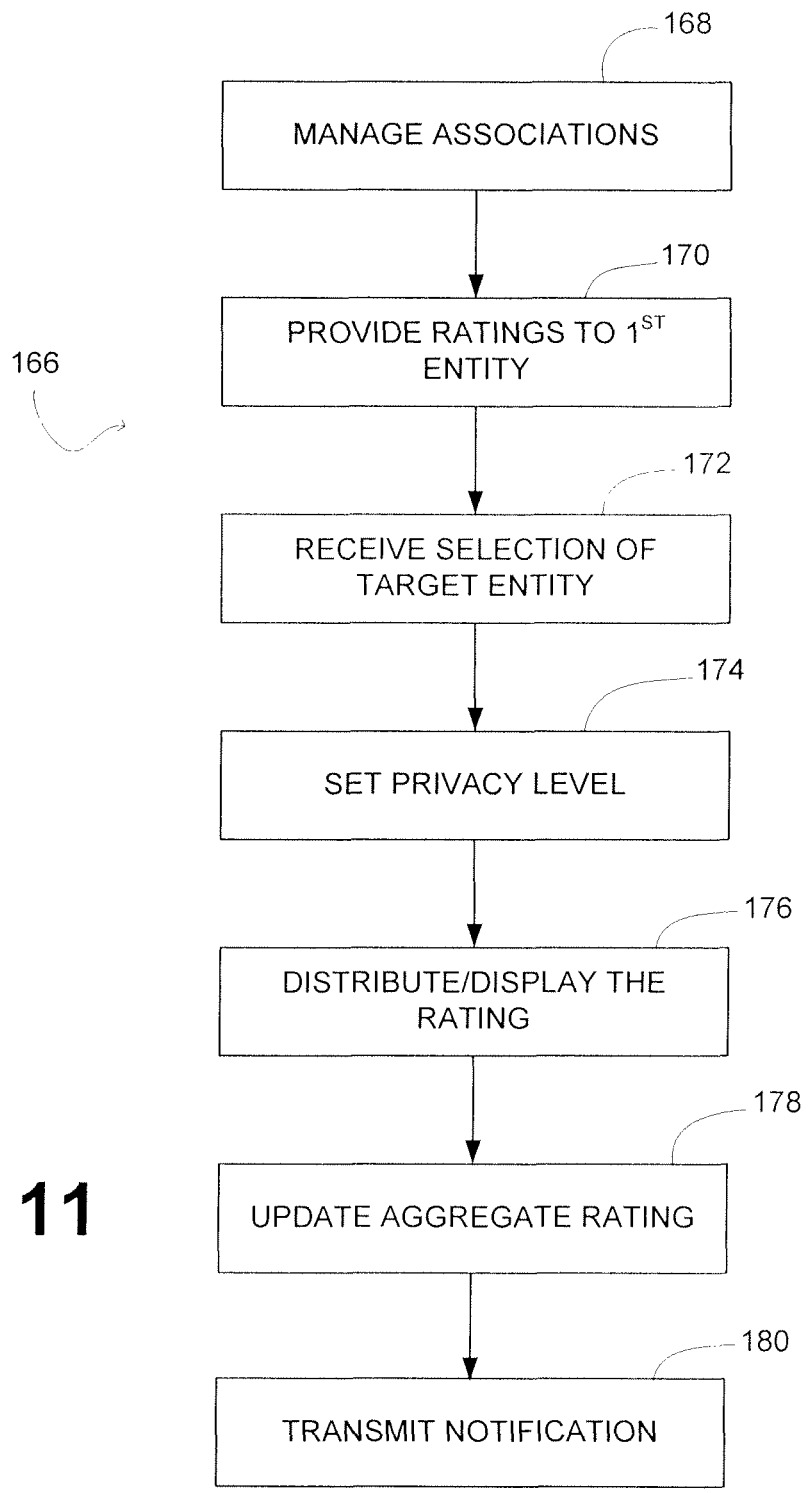
FIG. 11 illustrates a method of hosting a social networking website, in accordance with one or more embodiments of the invention.

FIG. 11 illustrates a method 166 of hosting a social network, including managing entities on the social network rating one another. The operations of method 166 presented below are intended to be illustrative. In some embodiments, method 166 may be accomplished with one or more additional operations not described, and/or without one or more of the operations discussed. Additionally, the order in which the operations of method 166 are illustrated in FIG. 11 and described below is not intended to be limiting.

In some embodiments, method 166 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 166 in response to instructions stored electronically on an electronic storage medium. The one or more processing devices may include one or more devices configured through hardware, firmware, and/or software to be specifically designed for execution of one or more of the operations of method 166.

At an operation 168, associations between entities that use the social network may be maintained. In some implementations, operation 168 may be performed by an association module similar to or the same as association module 27 (shown in FIG. 1 and described above).

At an operation 170, ratings are provided to a first entity for distribution on the social network. The ratings may include ratings that can be distributed by the first entity to other entities within the social network. Operation 170 may include updating an account or profile of the first entity to indicate that the ratings are available for the first entity to distribute. In some implementations, operation 170 may be performed by a ratings module similar to or the same as ratings module 42 (shown in FIG. 1 and described above).

At an operation 172, a selection of a target for a distribution of one or more ratings may be received from the first entity. The selection may be received, for example, through a webpage served to the first entity by a server hosting the social network. The target may include a second entity. Distribution of a rating from the first entity to the second entity may indicate approval (for a positive rating) or disapproval (for a negative rating) by the first entity of the second entity. In some implementations, operation 172 may be performed by a ratings module similar to or the same as ratings module 42 (shown in FIG. 1 and described above).

At an operation 174, a privacy level of the rating to be distributed to the second entity may be set. The privacy level of the rating to be distributed may be set in accordance with selection and/or entry of the privacy level by the first entity. In some implementations, operation 174 may be performed by a ratings module similar to or the same as ratings module 42 (shown in FIG. 1 and described above).

At an operation 176, the rating is distributed to the second entity, and is displayed on the wall of the second entity. Displaying the rating on the wall of the second entity may include presenting an indication of the rating (e.g., indicating the first entity as the source of the rating) in views of the wall served to entities using the social network in webpages. This may include making the indication of the rating viewable on the wall of the second entity in accordance with the privacy level set for the achievement at operation 174 and/or the associations between the first entity and other entities using the social network maintained at operation 168. For example, responsive to the privacy level being set high (e.g., private), the indication of the rating may be viewable on the wall of the second entity by entities associated (or having an appropriately high level of association) with the first entity, while the indication of the rating may be hidden for entities not associated (or having an appropriately high level of association) with the first entity. In some instances, the indication of the rating may be generalized (e.g., so that is does not reflect the first entity as the source) for entities that are not associated with the first entity. On the other hand, responsive to the privacy level being set low (e.g., public), the indication of the rating may be viewable on the wall of the second entity for other entities without regard for associations with the first entity. The operation 176 may be performed by a ratings module similar to or the same as ratings module 42 (shown in FIG. 1 and described above).

At an operation 178, a representation of the aggregated ratings received by the second entity from other entities (including the first entity) may be updated based on the received rating. For example, to aggregate received ratings, positive ratings may be added and negative ratings may be subtracted. Other aggregation techniques may be implemented (e.g., averaging, etc.). Updating the representation of the aggregated ratings may include updating the aggregation of the ratings, and then adjusting the representation in views of the wall of the second entity. The representation of the aggregated ratings, including the received rating, may be updated and presented to other entities without regard for the privacy level of the received rating. Thus, the representation of the aggregated ratings may provide a comprehensive representation of the received ratings, even if individual ratings are not reflected on the wall showing the specific sources (e.g., due to privacy settings of the received ratings). In some implementations, operation 178 may be performed by a ratings module similar to or the same as ratings module 42 (shown in FIG. 1 and described above).

At an operation 180, notification of the rating may be transmitted to entities other than the second entity. The notification may be transmitted to other entities having a requisite relationship (e.g., friendship, buddies, follower, and/or other relationships) with the first entity and/or the second entity. The notifications may further be filtered based on the privacy level of the rating and/or the associations of the other entities with the first entity. For example, responsive to the privacy level of the rating being set high (e.g., private), the notification may be provided only to entities having the requisite relationship with the first entity and/or the second entity, and being associated (or having an appropriately high level of association) with the first entity. On the other hand, responsive to the privacy level being set low (e.g., public), the notification of the rating may be provided to all of the entities having the requisite relationship with the first entity and/or the second entity without regard for whether the entities are associated with the second entity.

Figure 12:
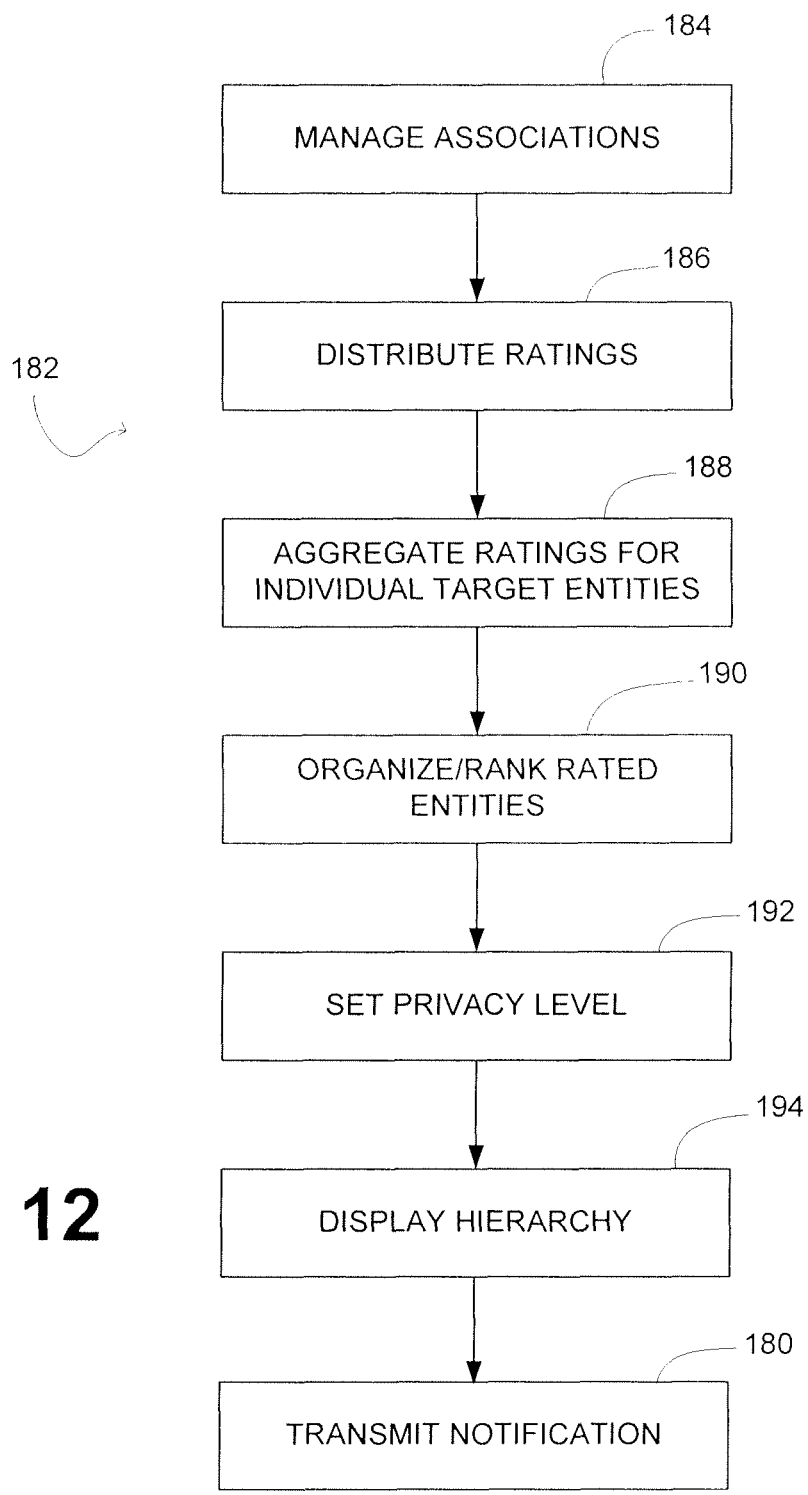
FIG. 12 illustrates a method of hosting a social networking website, in accordance with one or more embodiments of the invention.

FIG. 12 illustrates a method 182 of hosting a social network, including managing entities on the social network rating one another. The operations of method 182 presented below are intended to be illustrative. In some embodiments, method 182 may be accomplished with one or more additional operations not described, and/or without one or more of the operations discussed. Additionally, the order in which the operations of method 182 are illustrated in FIG. 12 and described below is not intended to be limiting.

In some embodiments, method 182 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 182 in response to instructions stored electronically on an electronic storage medium. The one or more processing devices may include one or more devices configured through hardware, firmware, and/or software to be specifically designed for execution of one or more of the operations of method 182.

At an operation 184, associations between entities that use the social network may be maintained. In some implementations, operation 184 may be performed by an association module similar to or the same as association module 27 (shown in FIG. 1 and described above).

At an operation 186, ratings may be distributed from a first entity to individual ones of a set of rated entities on the social network. The ratings may be distributed responsive to selection and/or entry received from the first entity that the ratings should be distributed, and to which entities the ratings should be distributed. In some implementations, operation 186 may be performed by a ratings module similar to or the same as ratings module 42 (shown in FIG. 1 and described above).

At an operation 188, ratings distributed to the set of rated entities may be aggregated on a per-rated entity basis. The aggregation may include adding positive ratings, subtracting negative ratings, averaging distributed ratings, and/or other aggregation techniques. Operation 188 may result individual entities in the set of rated entities being assigned aggregated ratings determined from the ratings they received from the first entity. In some implementations, operation 188 may be performed by a ratings module similar to or the same as ratings module 42 (shown in FIG. 1 and described above).

At an operation 190, a hierarchy of entities in the set of rated entities may be determined. The hierarchy of entities may be determined by organizing and/or ranking the rated entities based on the aggregated ratings determined for the individual rated entities at operation 188. Since, for the purposes of method 182, the rated entities are organized and/or ranked based on the ratings distributed by the first entity, and not all ratings distributed to the rated entities within the social network, the hierarch of entities may be internal to the first entity. In some implementations, operation 190 may be performed by a ratings module similar to or the same as ratings module 42 (shown in FIG. 1 and described above).

At an operation 192, a privacy level of the internal hierarchy may be set. The privacy level of the internal hierarchy may be set in accordance with selection and/or entry of the privacy level by the first entity. In some implementations, operation 190 may be performed by a ratings module similar to or the same as ratings module 42 (shown in FIG. 1 and described above).

At an operation 194, the rating is made viewable on the wall of the first entity. Displaying the rating on the wall of the first entity may include presenting at least a portion of the hierarchy of rated entities in views of the wall served to entities using the social network in webpages. This may include making the internal hierarchy (or a portion thereof) viewable on the wall of the first entity in accordance with the privacy level set for the internal hierarchy at operation 192 and/or the associations between the first entity and other entities using the social network maintained at operation 184. For example, responsive to the privacy level being set high (e.g., private), the internal hierarchy may be viewable on the wall of the first entity by entities associated (or having an appropriately high level of association) with the first entity, while the internal hierarchy may be hidden for entities not associated (or having an appropriately high level of association) with the first entity.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system configured to host a social network, the system comprising:
   a server configured to host webpages that define views of the social network, and to transmit the webpages to client computing platforms that request the webpages over a network, the server being configured to execute computer program modules, the computer program modules comprising:
   an entity wall module configured to assemble webpages defining views of walls associated with individual entities;
   an association module configured to maintain associations between entities that indicate which of the entities that have walls are associated with each other; and
   a certificate transmission module configured to transmit certificates from issuing entities to receiving entities such that received certificates are selectively reflected on the walls of the receiving entities,
   wherein the certificates including public certificates and private certificates, and
   wherein the certificate transmission module, the wall module and the association module are configured such that (i) responsive to a private certificate being transmitted to a receiving entity, the private certificate is viewable on the wall of the receiving entity by other entities that are associated with the issuing entity and is hidden on the wall of the receiving entity from other entities that are not associated with the issuing entity, and (ii) responsive to a public certificate being transmitted to the receiving entity, the public certificate is viewable by other entities on the wall of the receiving entity without regard for associations with the issuing entity.

2. The system of claim 1, wherein the computer program modules further comprise a certificate creation module configured to assemble webpages defining a user interface that enables entities to generate certificates for other entities that affirm achievements or activities of the receiving entities, and wherein the user interface enables issuing entities to indicate whether individual certificates are public or private.

3. The system of claim 1, wherein the wall module is further configured to include indications on the walls of the issuing entities of the certificates they have issued.

4. The system of claim 3, wherein the wall module and the association module are configured such that (i) responsive to a certificate being private, the indication on the wall of the issuing entity for the private certificate is viewable by other entities that are associated with the issuing entity and is hidden from other entities that are not associated with the issuing entity, and (ii) responsive to the certificate being public, the indication on the wall of the issuing entity for the public certificate is viewable by other entities without regard for association with the issuing entity.

5. The system of claim 1, wherein the association module is further configured to receive requests for associations between entities from requesting entities to responding entities, to present the requests for associations to the responding entities for acceptance or refusal, and to provide the responses of the responding entities to the requesting entities.

6. The system of claim 1, wherein the issuing entities comprise one or more of an organization, a university, a school, a corporation, a foundation, a government department, a religious organization, a family, a league, or a partnership.

7. The system of claim 6, wherein the receiving entities comprise individuals.

8. A computer-implemented method of hosting a social network, wherein the method is implemented in a server configured to host webpages that define views of the social network, and to transmit the webpages to client computing platforms that request the webpages over a network, the server comprising one or more processors configured to execute one or more computer program modules, the method comprising:
  executing, on the one or more processors of the server, one or more computer program modules configured to assemble webpages defining views of a wall associated with a first entity;
  executing, on the one or more processors of the server, one or more computer program modules configured to maintain associations between entities that use the social network;
  executing, on the one or more processors of the server, one or more computer program modules configured to transmit a certificate from a second entity to the first entity;
  executing, on the one or more processors of the server, one or more computer program modules configured to make, responsive to the certificate being a private certificate, the certificate viewable on the wall of the first entity by other entities that are associated with the second entity and to make the certificate hidden on the wall of the receiving entity from other entities that are not associated with the second entity; and
  executing, on the one or more processors of the server, one or more computer program modules configured to make, responsive to the certificate being a public certificate, the certificate viewable by other entities on the wall of the first entity without regard for associations with the second entity.

9. The method of claim 8, further comprising executing, on the one or more processors of the server, one or more computer program modules configured to assemble webpages defining a user interface that enables the second entity to generate the certificate to affirm achievements or activities of the first entity, and wherein the user interface enables the second entity to indicate whether certificate is public or private.

10. The method of claim 8, further comprising:
  executing, on the one or more processors of the server, one or more computer program modules configured to assemble webpages defining views of a wall associated with a second entity; and
  executing, on the one or more processors of the server, one or more computer program modules configured to include an indication on the wall of the second entity of the issued certificate.

11. The method of claim 10, wherein (i) responsive to a certificate being private, the indication on the wall of the second entity for the private certificate is viewable by other entities that are associated with the second entity and is hidden from other entities that are not associated with the second entity, and (ii) responsive to the certificate being public, the indication on the wall of the second entity for the public certificate is viewable by other entities without regard for association with the second entity.

12. The method of claim 8, further comprising:
  executing, on the one or more processors of the server, one or more computer program modules configured to receive requests for associations with the second entity from requesting entities;
  executing, on the one or more processors of the server, one or more computer program modules configured to present the requests to the second entity for acceptance or refusal; and
  executing, on the one or more processors of the server, one or more computer program modules configured to provide the responses of the second entity to the requesting entities.

13. The method of claim 8, wherein the second entity comprises one or more of an organization, a university, a school, a corporation, a foundation, a government department, a religious organization, a family, a league, or a partnership.

14. The method of claim 13, wherein the first entity is an individual.

15. A system configured to host a social network, the system comprising:
  a server configured to host webpages that define views of the social network, and to transmit the webpages to client computing platforms that request the webpages over a network, the server being configured to execute computer program modules, the computer program modules comprising:
    an entity wall module configured to assemble webpages defining views of walls associated with individual entities;
    an association module configured to maintain associations between entities that indicate which of the entities that have walls are associated with each other; and an achievement module configured to receive achievements input by entities having walls,
    wherein the achievements include public achievements and private achievements, and
    wherein the achievement module, the wall module and the association module are configured such that (i) responsive to a private achievement being input by an inputting entity, the private achievement is viewable on the wall of the inputting entity by other entities that are associated with the inputting entity and is hidden on the wall of the inputting entity from other entities that are not associated with the inputting entity, and (ii) responsive to a public certificate being input by the inputting entity, the public certificate is viewable by other entities on the wall of the inputting entity without regard for associations with the inputting entity.

16. The system of claim 15, wherein the achievement module is configured to assemble webpages defining a user interface that enables entities to input achievements, and wherein the user interface enables the entities to indicate whether individual achievements are public or private.

17. The system of claim 16, wherein the achievement module such that the user interface enables the entities inputting the achievements to indicate the individuals that accomplished the achievements.

18. The system of claim 15, wherein the association module is further configured to receive requests for associations between entities from requesting entities to responding entities, to present the requests for associations to the responding entities for acceptance or refusal, and to provide the responses of the responding entities to the requesting entities.

19. The system of claim 15, wherein the inputting entity comprises one or more of an organization, a university, a school, a corporation, a foundation, a government department, a religious organization, a family, a league, or a partnership.

* * * * *